(12) United States Patent
Li et al.

(10) Patent No.: US 8,588,315 B2
(45) Date of Patent: Nov. 19, 2013

(54) DECODING APPARATUS AND DECODING METHOD

(75) Inventors: Zheng Zi Li, Seongnam-Si (KR); Yong Suk Hwang, Yongin-si (KR); Jae Hyeong Kim, Seoul (KR); Sang Bae Ji, Yongin-Si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 827 days.

(21) Appl. No.: 12/162,688

(22) PCT Filed: Feb. 21, 2007

(86) PCT No.: PCT/KR2007/000896
§ 371 (c)(1),
(2), (4) Date: Jul. 30, 2008

(87) PCT Pub. No.: WO2007/097566
PCT Pub. Date: Aug. 30, 2007

(65) Prior Publication Data
US 2009/0010348 A1   Jan. 8, 2009

(30) Foreign Application Priority Data

Feb. 21, 2006 (KR) .......................... 10-2006-0016795
Feb. 21, 2006 (KR) .......................... 10-2006-0016797

(51) Int. Cl.
*H04L 27/28* (2006.01)

(52) U.S. Cl.
USPC ........... 375/260; 375/130; 375/316; 375/349; 375/225; 370/208; 370/434; 370/347; 370/328; 370/329; 370/477; 370/436; 370/341; 370/331; 370/445; 455/450; 455/452.2; 455/433; 455/436; 455/445; 702/179; 702/177; 702/182; 702/183; 702/198

(58) Field of Classification Search
USPC .......... 375/260, 130, 316, 349, 225; 370/208, 370/343, 347, 328, 329, 477, 436, 341, 331, 370/445; 702/179, 177, 182, 183, 189; 455/450, 452.2, 433, 436, 445
See application file for complete search history.

(56) References Cited

U.S. PATENT DOCUMENTS

| | | | |
|---|---|---|---|
| 6,862,552 B2 * | 3/2005 | Goldstein et al. ............. | 702/179 |
| 7,639,660 B2 * | 12/2009 | Kim et al. ..................... | 375/260 |
| 2003/0026295 A1 | 2/2003 | Baum et al. | |
| 2005/0152326 A1 | 7/2005 | Vijayan et al. | |
| 2006/0056280 A1 * | 3/2006 | Ido et al. ....................... | 370/208 |

OTHER PUBLICATIONS

"Part 16: Air Interface for Broadband." IEEE Standard for. Amendment 1: Multihop Relay. New York: The Institute of Electrical and Electronics Engineers, Inc., 2009, 61-68.*

* cited by examiner

*Primary Examiner* — Shuwang Liu
*Assistant Examiner* — Ross Varndell
(74) *Attorney, Agent, or Firm* — Blank Rome LLP

(57) ABSTRACT

Provided are a decoding apparatus, a decoding method and a receiving apparatus for decoding in a system supporting an OFDM/OFDMA scheme. The decoding method includes the steps of: receiving phase-modulated signal; performing sub-carrier demodulation on the received signal and generating correlation metrics; generating decoding metrics using the correlation metrics; and determining a payload using the largest metric of the decoding metrics and at least one of an average metric and the second largest metric of the decoding metrics. The decoding apparatus includes: a receiving buffer for buffering received phase-modulated signal; a likelihood metric generator for generating decoding metrics corresponding to likelihoods of the received signal buffered in the receiving buffer being determined as respective potential payload values; a mean calculator for calculating an average metric; and a payload determiner for determining a payload using the largest metric of the decoding metrics and at least one of an average metric and the second largest metric of the decoding metrics.

46 Claims, 25 Drawing Sheets

DECODING APPARATUS AND DECODING METHOD

CROSS-REFERENCE TO RELATED APPLICATIONS

The present application is a National Phase of PCT/KR2007/000896, filed Feb. 21, 2007, which claims the benefit of Korean Application Nos. 10-2006-0016797 and 10-2006-0016795, filed Feb. 21, 2006, the entire disclosures of which are incorporated by reference herein.

FIELD OF THE INVENTION

Technical Field

The present invention relates to decoding using likelihood in wireless data communication, and more particularly, to a decoding apparatus, a decoding method, and a receiving apparatus for decoding used in wireless portable Internet communication.

BACKGROUND OF THE INVENTION

Background Art

In wireless data communication, there is employed a method using likelihood to estimate a correct signal from a signal influenced by noise. Encoding in the method is a process of symbol-mapping data, i.e., a payload to be transmitted, into a larger number of signals to modulate the data in a transmitting side of a data communication system. And, decoding in the method is a process of estimating a payload having the highest likelihood from the symbol-mapped signals according to an appropriate estimation algorithm in a receiving side of the data communication system. In the encoding process using likelihood, it is preferable for the sake of accurate error correction that data is not just simply symbol-mapped based on its quantity but rather symbol-mapped to large areas of the frequency domain and the time domain. The above-described encoding-decoding method is used for data communication in fields where no data corruption can be tolerated and also is used to transmit a signal requiring a high degree of accuracy, such as a control signal, e.g., an ACK/NACK signal, and a feedback signal, in general wireless data communication.

Meanwhile, various techniques of modulating amplitude or frequency have been suggested as a method of transmitting data on a carrier. Among the techniques, quadrature phase shift keying (QPSK) modulation changes the phase of a carrier by 90 degrees and transfers 2 bits of information using signs of one period. QPSK modulation enables accurate demodulation. Therefore, QPSK modulation is used in mobile communication equipment such as digital cellular phones, car phones, digital cordless phones, etc., and is also used for signal transmission schemes of recently provided wireless portable Internet service.

Looking back at the development of wireless data communication systems, cellular mobile telecommunication systems were first introduced in the United States in the late 1970's. This was followed by Korea's advanced mobile phone service (AMPS), an analog mode of a first generation (1G) mobile communication system enabling wireless voice communication. In the mid 1990's, a second generation (2G) mobile communication system was commercialized. This was followed in the late 1990's by commercialization of a part of the International Mobile Telecommunication-2000 (IMT-2000) standard, which has served as a third generation (3G) mobile communication system for providing high-speed wireless multimedia data service.

Nowadays, research is aimed at upgrading the 3G mobile communication system into a fourth generation (4G) mobile communication system. In particular, portable Internet technology is being vigorously researched with the goal of enabling faster data transmission than in a 3G mobile communication system.

The portable Internet satisfies users' demands for high-speed Internet service, anytime, anywhere, via a portable device, and is having a ripple effect on the entire information and communication industry in Korea. Therefore, the portable Internet is a new and promising industry, and international standardization of the portable Internet is currently in progress on the basis of the Institute of Electrical and Electronics Engineers (IEEE) 802.16e standard.

FIG. 1 schematically illustrates the structure of a portable Internet service system to which the present invention is applied. The illustrated portable Internet service system comprises portable subscriber stations (PSSs) 12, radio access stations (RASs) 13, access control routers (ACRs) 14, and a policy (authentication authorization and accounting (AAA)) server 15. The PSSs 12 are used by subscribers to receive portable Internet service. The RASs 13 are located at wire network ends for transmitting and receiving data to and from the PSSs 12 through wireless interfaces. The ACRs 14 are for controlling the RASs 13 and routing Internet protocol (IP) packets. The policy (AAA) server 15 performs authentication, authorization and billing for a subscriber and a PSS 12, and provides service only to authorized subscribers connected with the portable Internet network.

The PSSs 12 and the RASs 13 communicate using an Orthogonal Frequency Division Multiplexing (OFDM)/Orthogonal Frequency Division Multiple Access (OFDMA) scheme. The OFDMA scheme is a multiplexing method combining a frequency division method (FDM), which uses subcarriers of a plurality of orthogonal frequencies as a plurality of subchannels, with a time division method (TDM). Since the OFDM/OFDMA scheme is essentially robust against fading generated in a multi-path and has a high data transfer rate, it is possible to obtain optimum transfer efficiency in high-speed data transfer. Thus, the OFDMA scheme fully supports PSS mobility in portable Internet systems.

SUMMARY OF THE INVENTION

Disclosure

Technical Problem

As described above, in order to ensure accuracy in transmitting and receiving an essential signal like a control signal, e.g., a fast feedback signal and an ACK/NACK signal, a wireless communication system based on the OFDMA scheme, etc. employs a modulation/encoding method whereby a payload is symbol-mapped in a sufficiently wide channel, and transmitted.

However, when a receiving side estimates a payload that has been symbol-mapped in a wireless channel as mentioned above, a received signal's likelihoods with respect to a channel signal for all potential payload values must be calculated, which becomes a heavy burden on the system of the receiving side.

In addition, the control signals include important information for setting up a communication environment between a PSS and an RAS. Here, when the communication environment temporarily becomes worse, and the setting is changed by a fast control signal received under the weak condition, the service quality may be significantly deteriorated.

Therefore, the present invention is directed to a receiving apparatus, a decoding apparatus, and a decoding method capable of ensuring stable operation while simplifying a decoding structure.

In further detail, the present invention is directed to a receiving apparatus, decoding apparatus, and decoding method selecting a previous result when a decoding result based on a received signal is not sufficient for a predetermined reference value.

Technical Solution

One aspect of the present invention provides a decoding method in a system supporting an Orthogonal Frequency Division Multiplexing (OFDM)/Orthogonal Frequency Division Multiple Access (OFDMA) scheme, the decoding method comprising the steps of: receiving phase-modulated signal; performing subcarrier demodulation on the received signal and generating correlation metrics; generating decoding metrics using the correlation metrics; and determining a payload using the largest metric of the decoding metrics and at least one of the average metric and the second largest metric of the decoding metrics.

Another aspect of the present invention provides a decoding apparatus in a system supporting the OFDM/OFDMA scheme, the decoding apparatus comprising: a receiving buffer for buffering received phase-modulated signal; a likelihood metric generator for generating decoding metrics corresponding to likelihoods of the received signal buffered in the receiving buffer being determined as respective potential payload values; and a payload determiner for determining a payload using the largest metric of the decoding metrics and at least one of the average metric and the second largest metric of the decoding metrics.

Yet another aspect of the present invention provides a receiving apparatus for decoding in a system supporting the OFDM/OFDMA scheme, the receiving apparatus comprising: a subcarrier demodulator for performing subcarrier demodulation on a received signal to generate correlation metrics using subcarrier demodulation basis vectors; a decoding metric generator for generating decoding metrics from the correlation metrics; and a payload determiner for determining a payload using the largest metric of the decoding metrics or a previous frame metric according to a predetermined reference.

Advantageous Effects

The inventive decoding apparatus, decoding method and receiving apparatus can accurately detect a payload with a simple structure.

In addition, when a large amount of noise is added to a received signal, a previous payload is kept, so that stability of communication quality can be obtained.

BRIEF DESCRIPTION OF THE DRAWINGS

Description of Drawings

Figure 1:
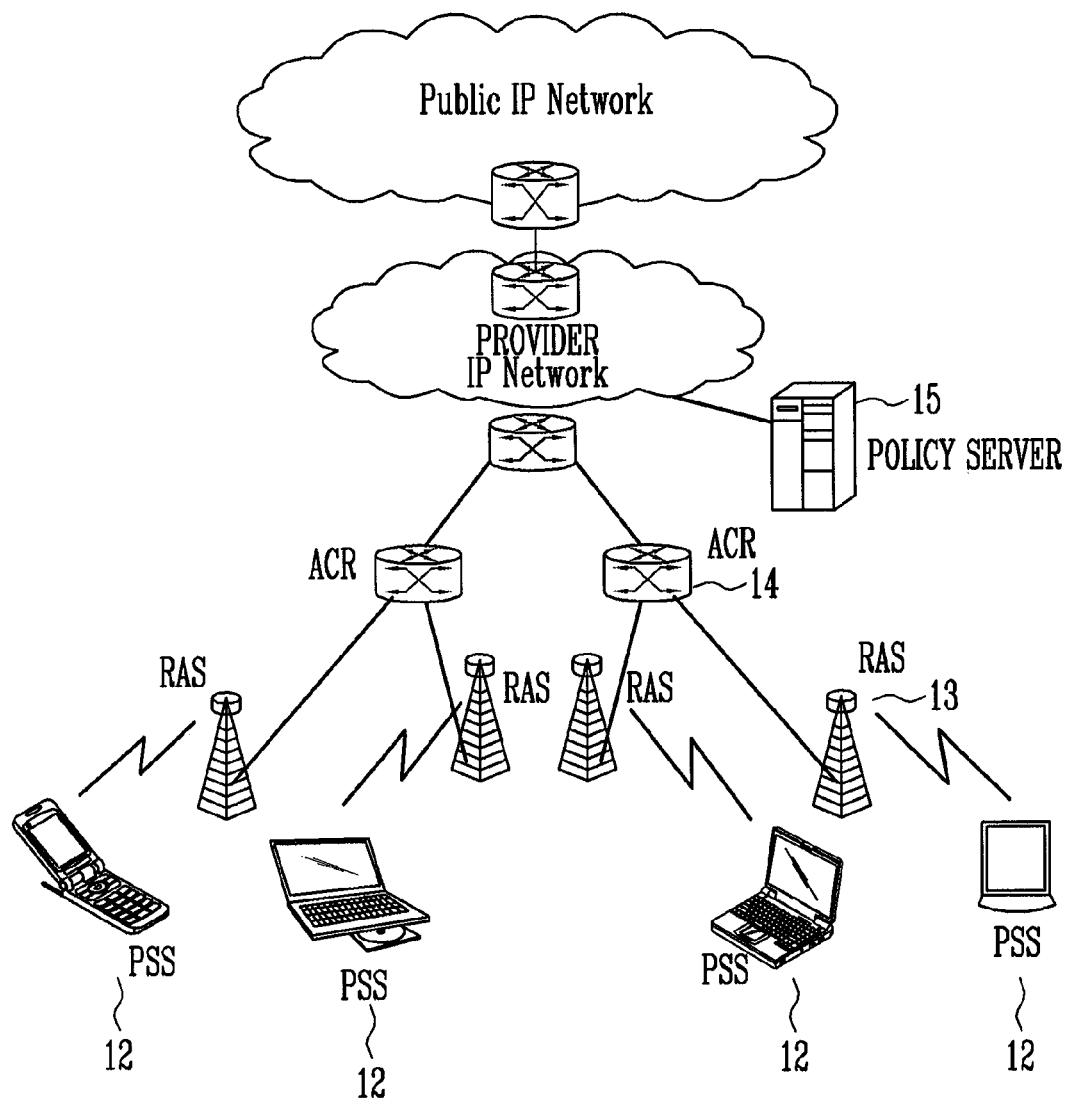
Figure 2:
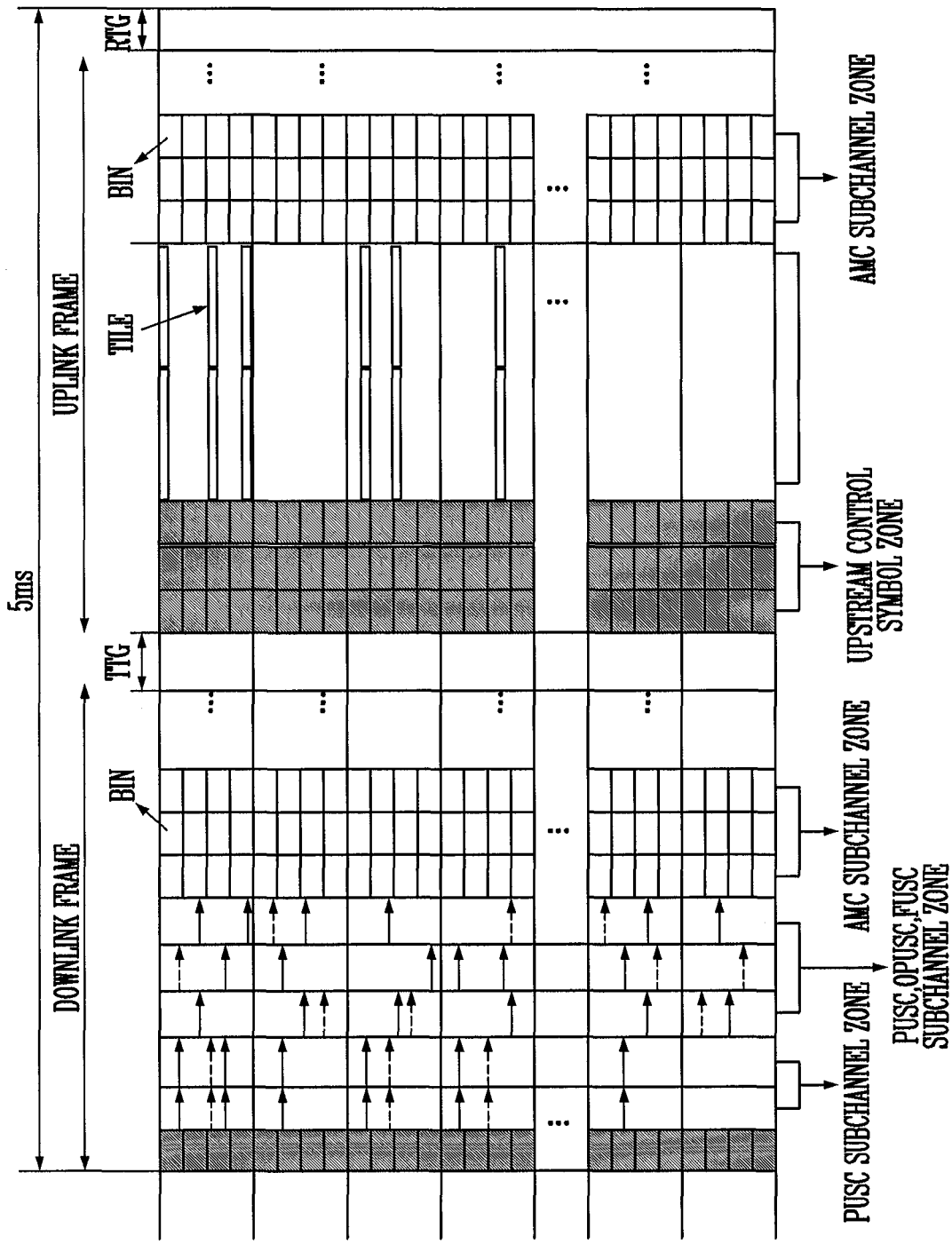
Figure 3:
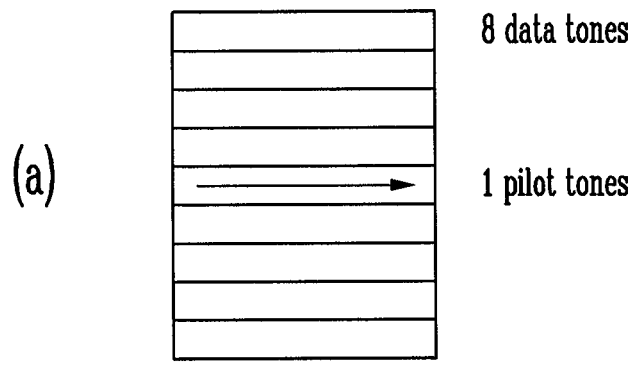
Figure 3:
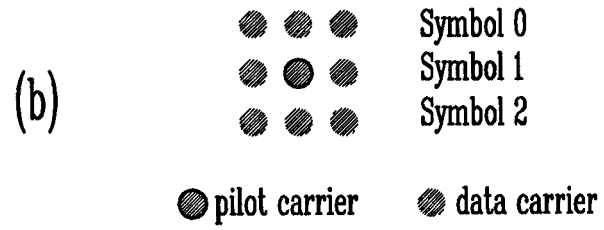
Figure 3:
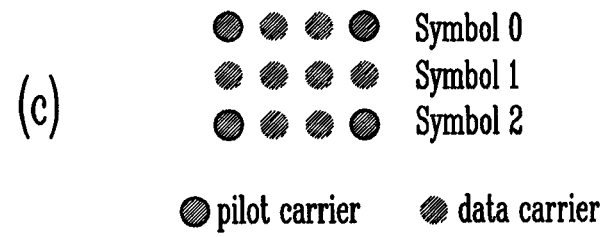
Figure 4:
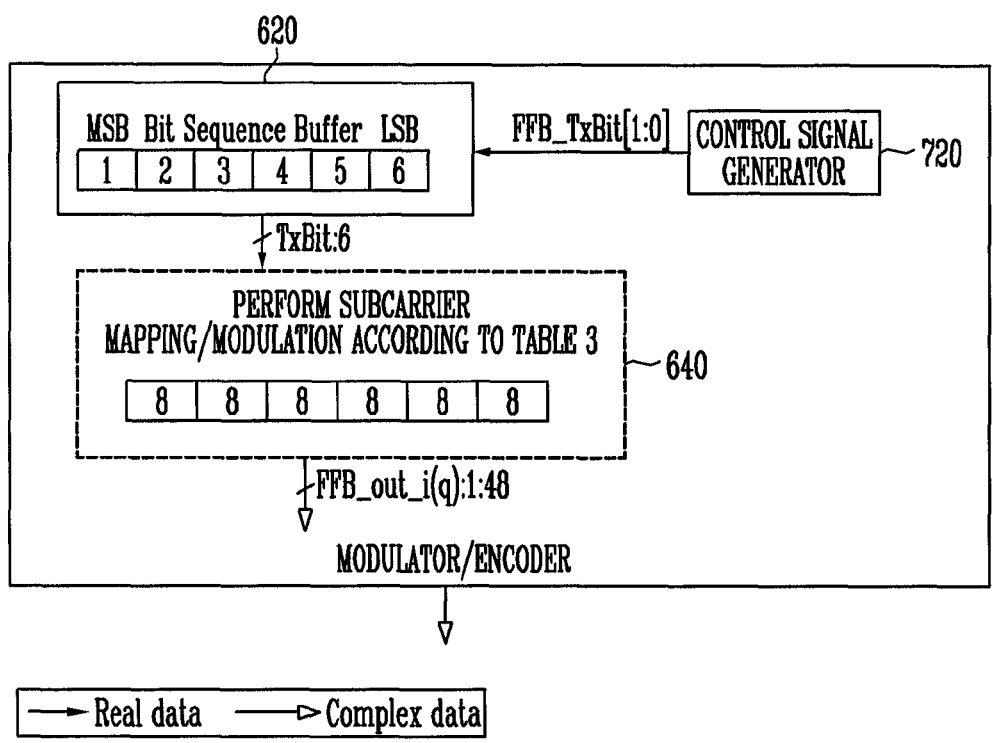
Figure 5:
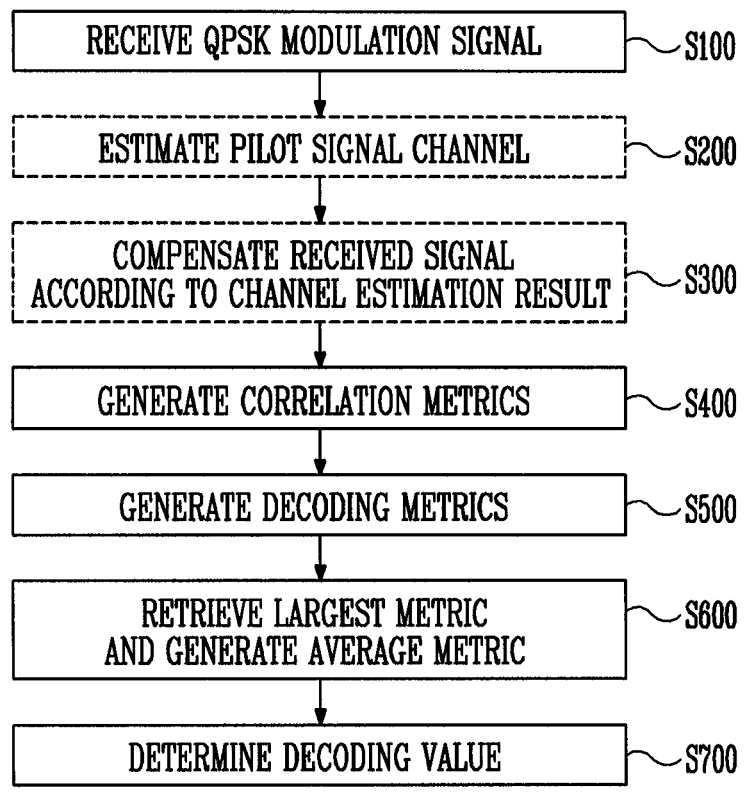
Figure 6:
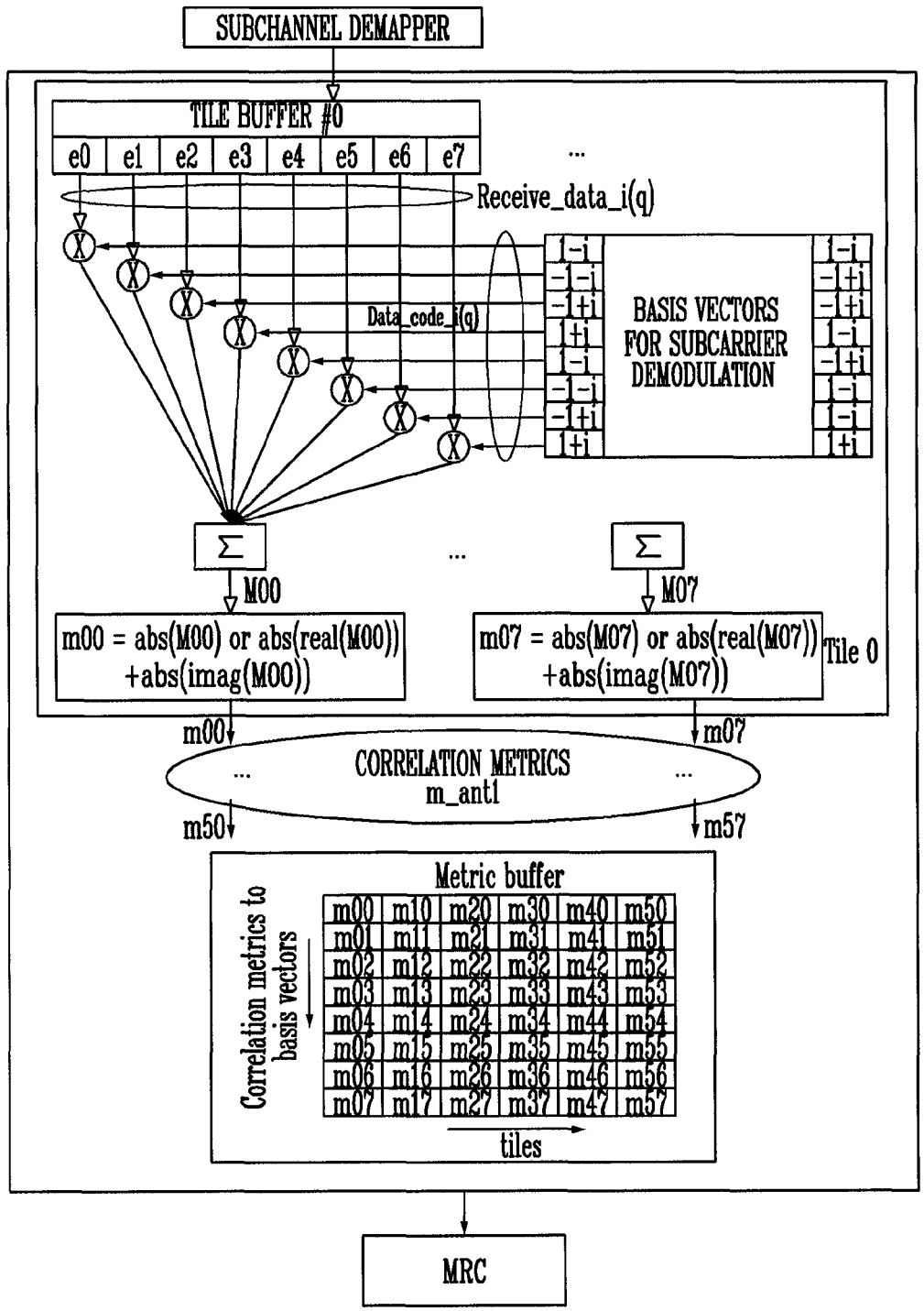
Figure 7:
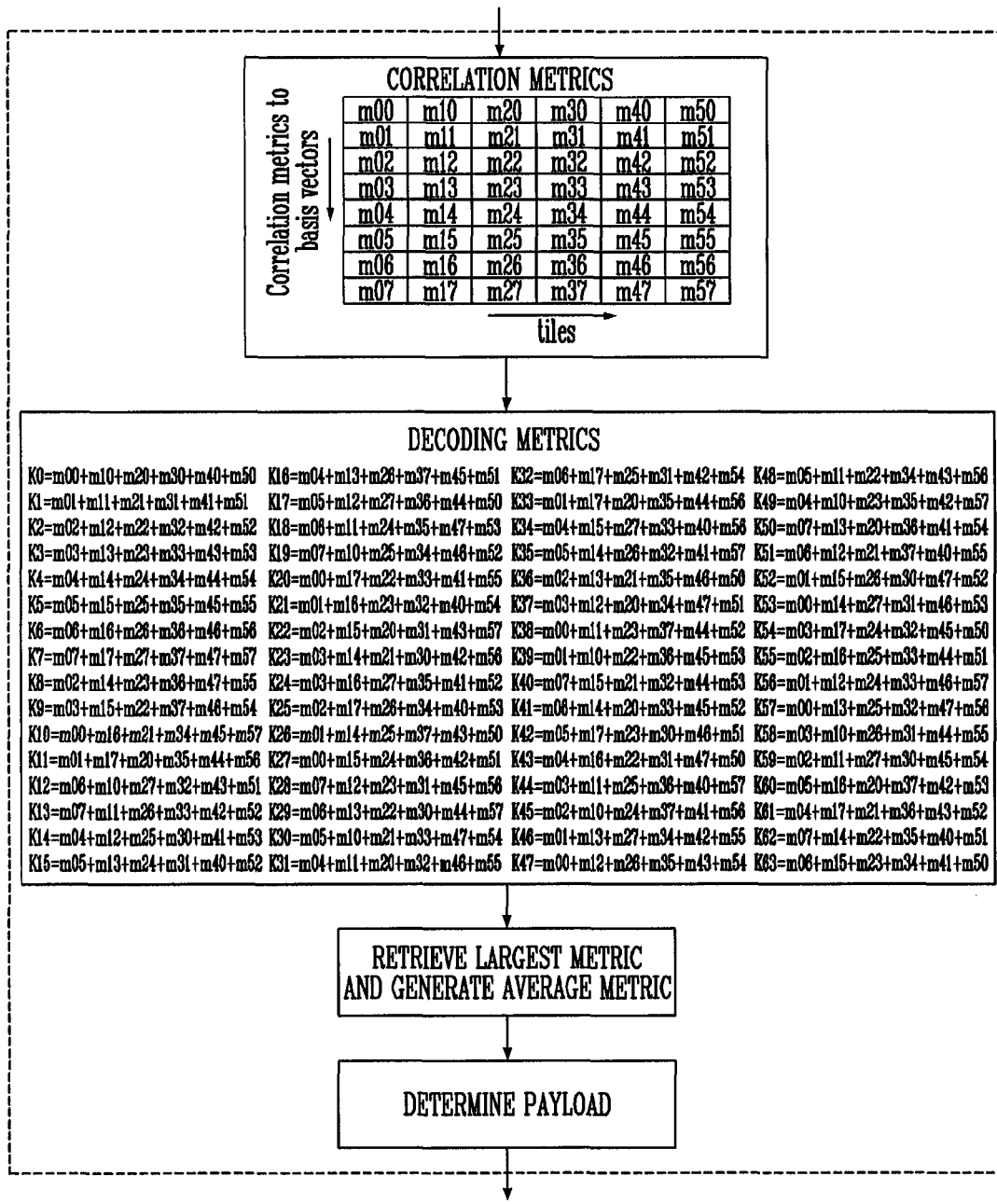
Figure 8:
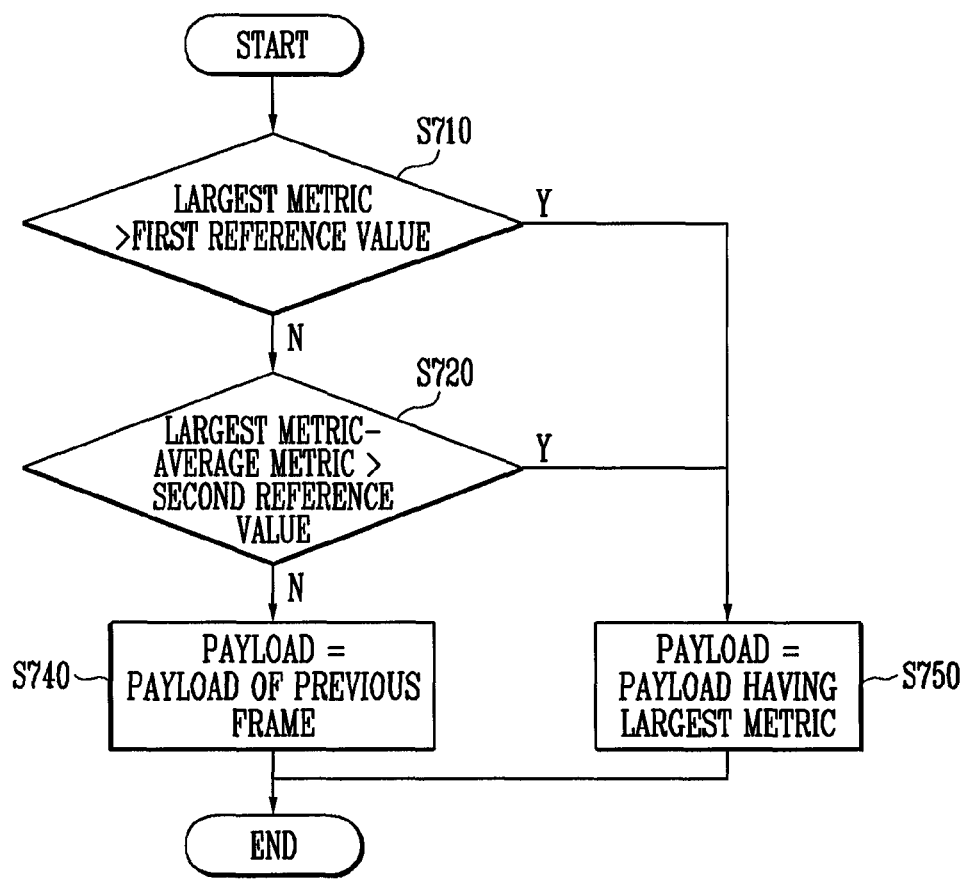
Figure 14:
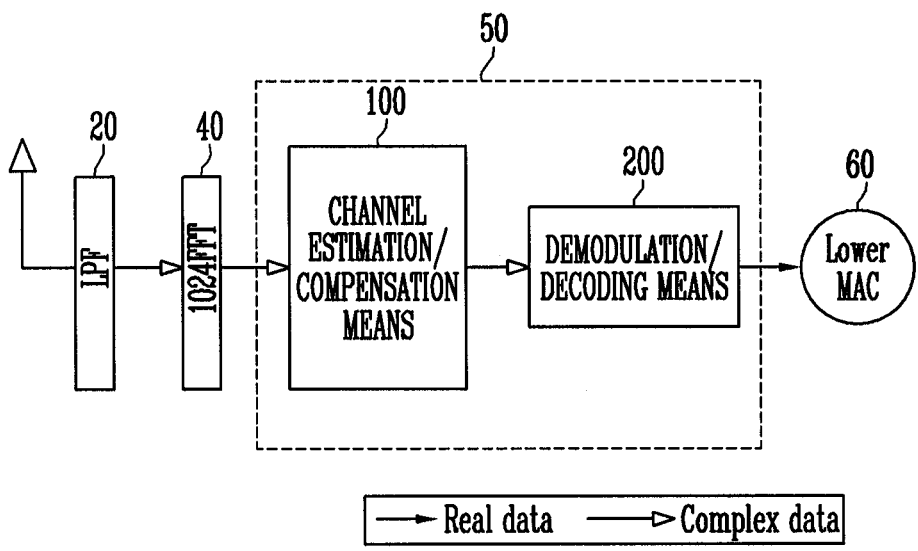
Figure 15:
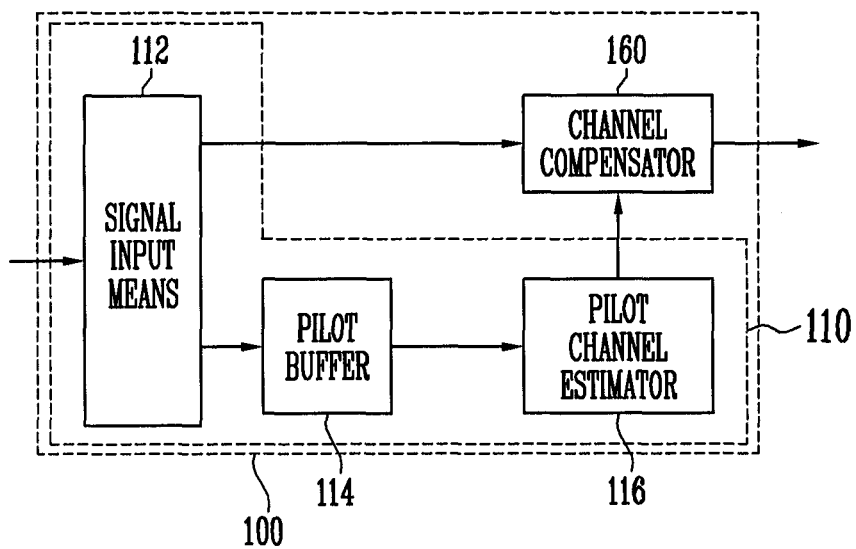
Figure 16:
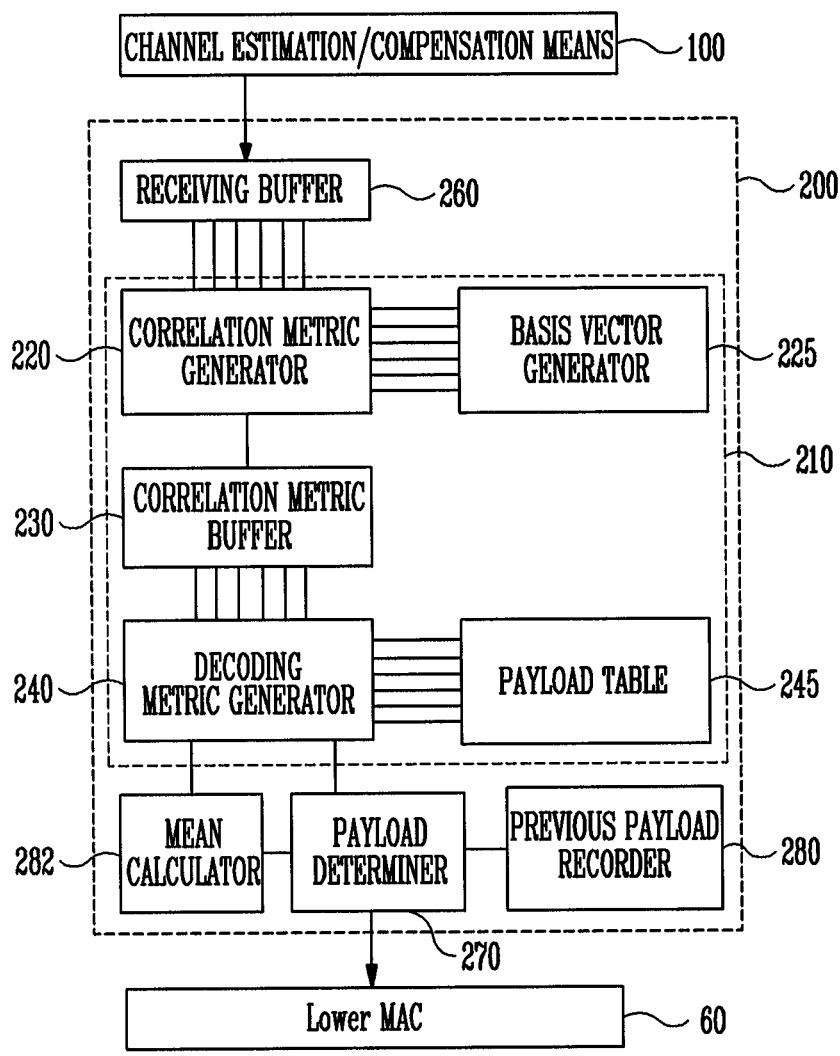
Figure 17:
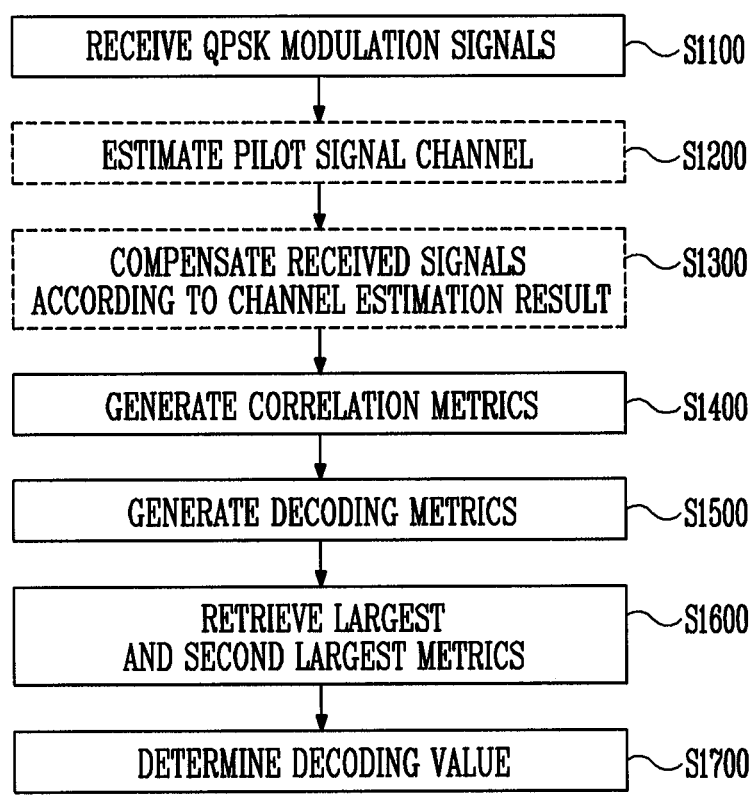
Figure 18:
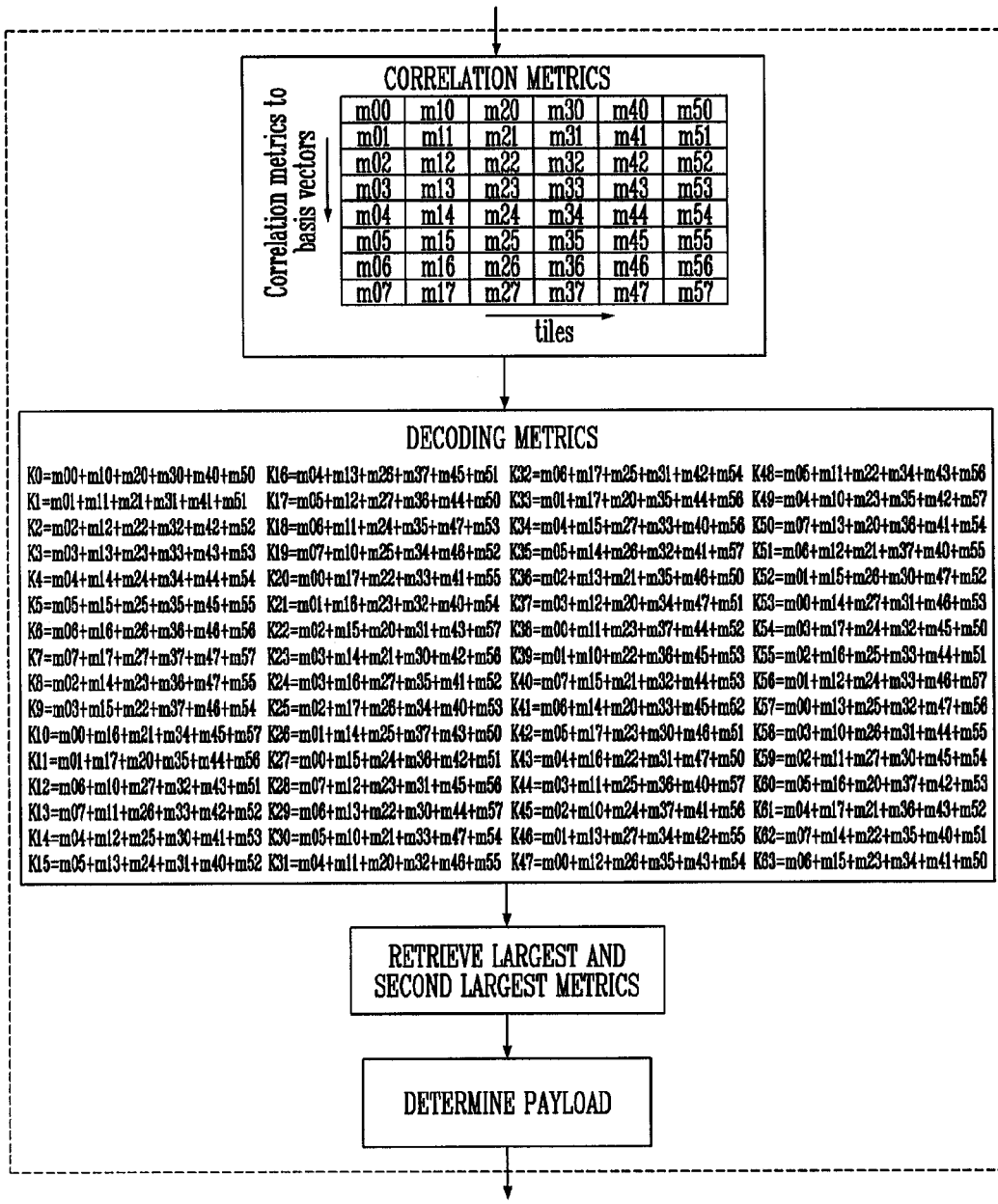
Figure 19:
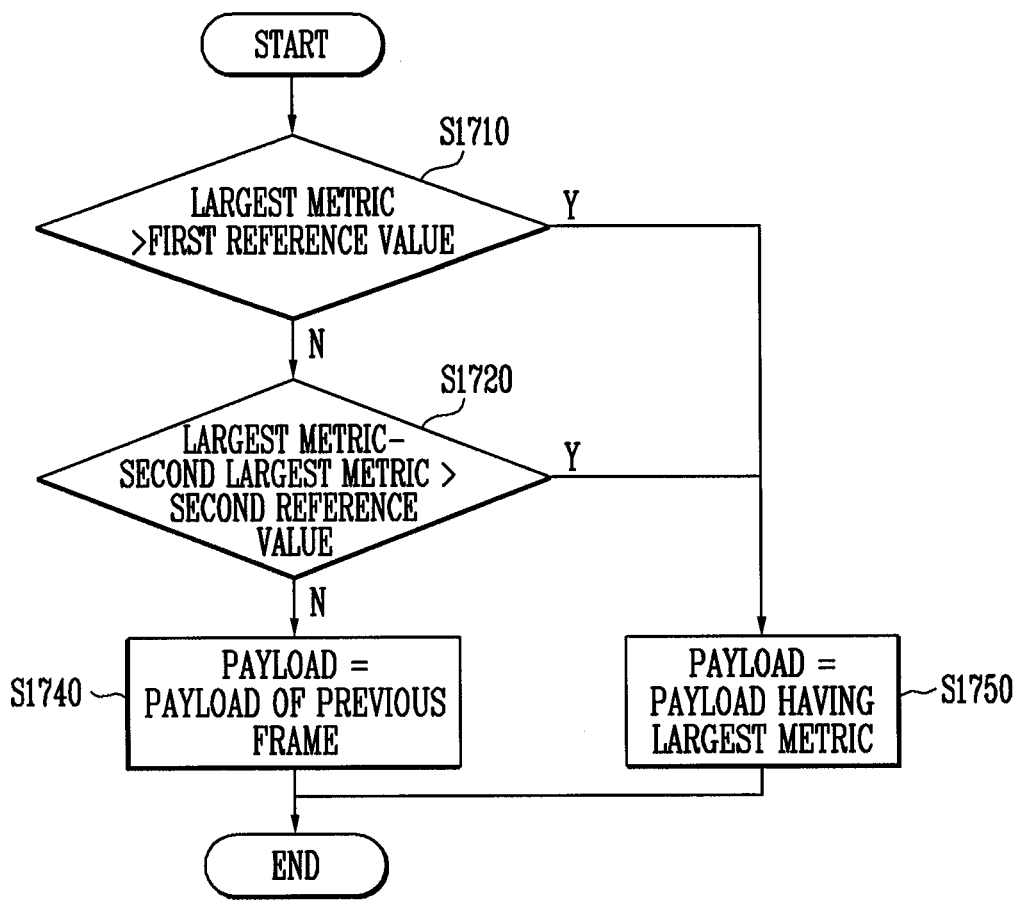
Figure 23:
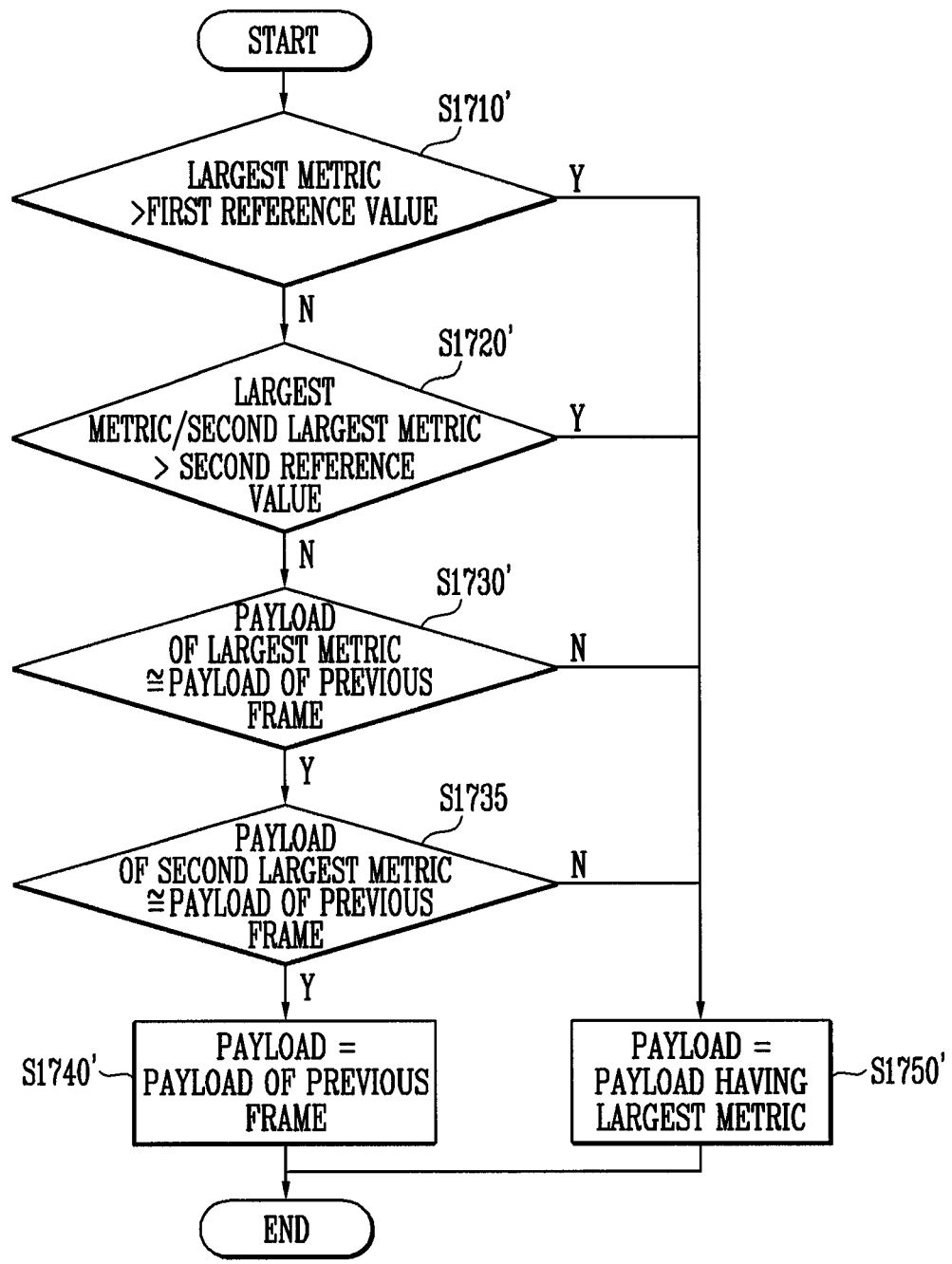
Figure 24:
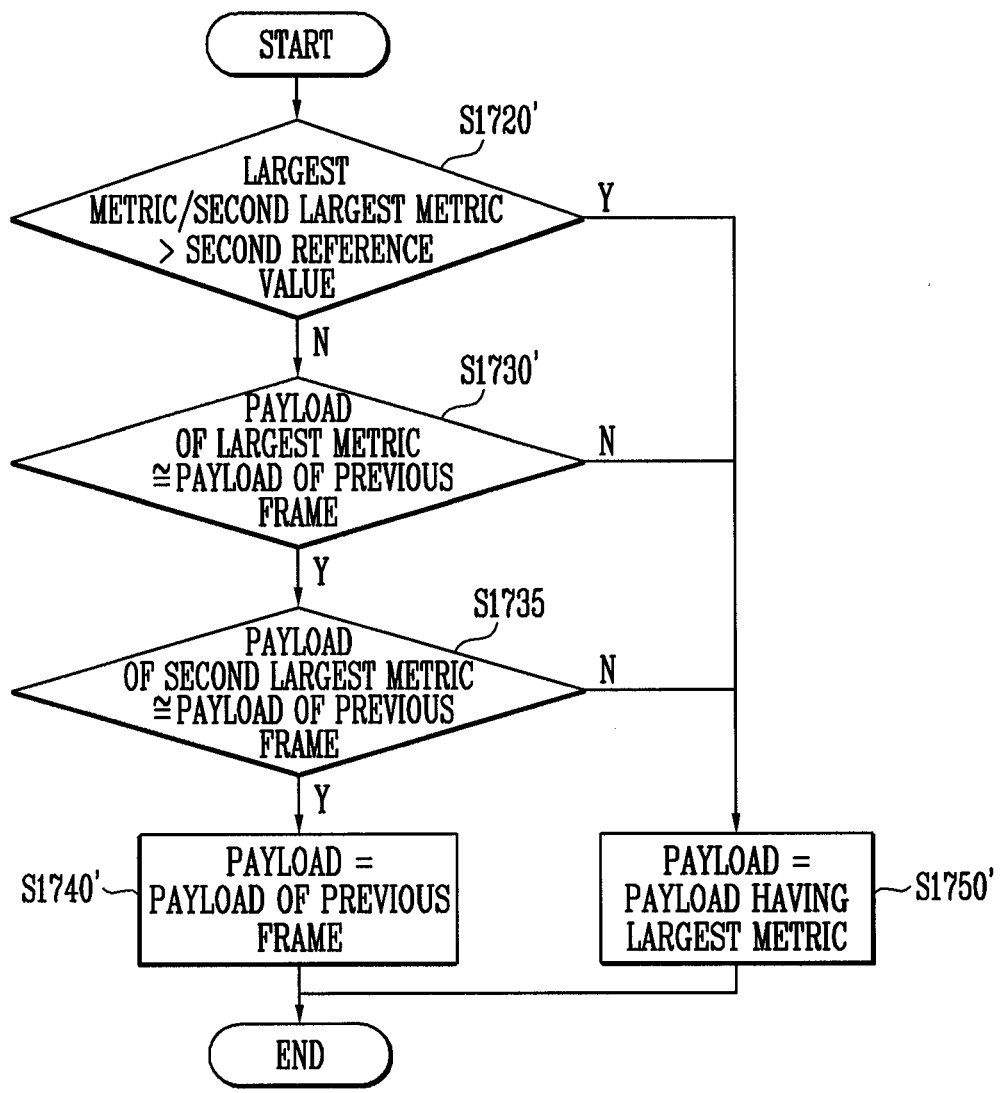
Figure 25:
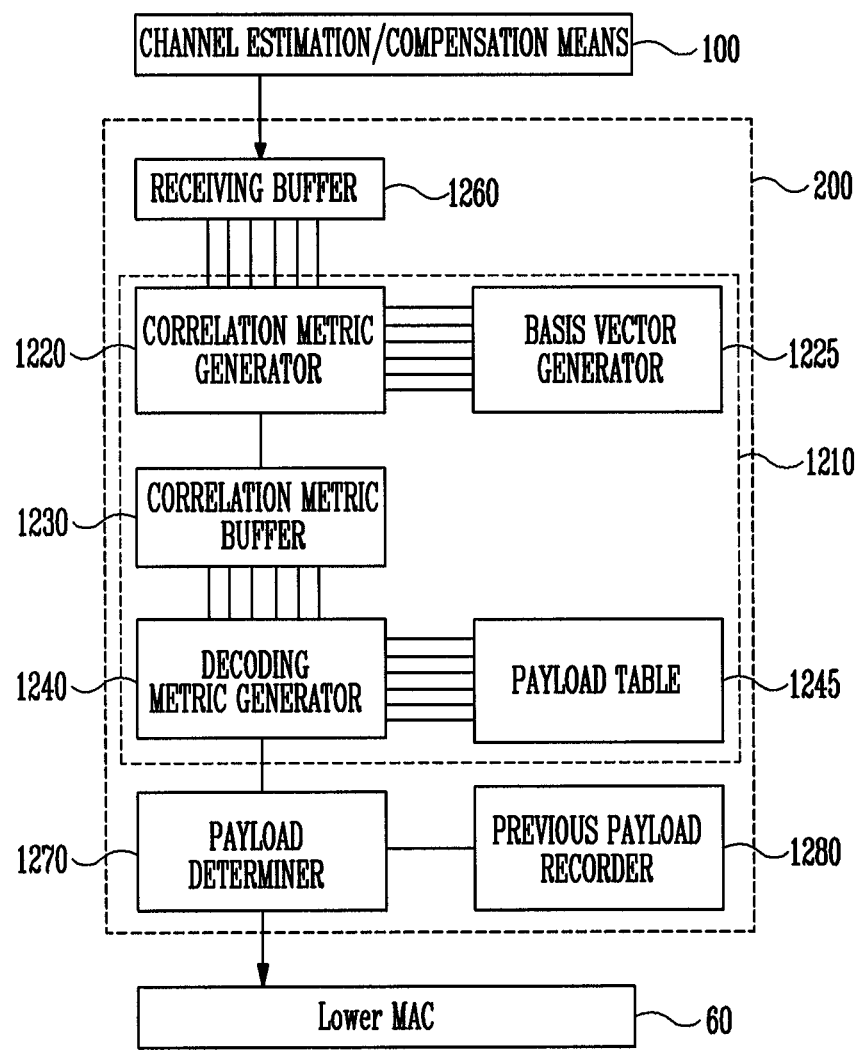

FIG. 1 illustrates the structure of a wireless portable Internet system in which a decoding apparatus of the present invention can be implemented;

FIG. 2 is a timing diagram showing a structure of a data transmission frame of a wireless portable Internet system;

FIG. 3A illustrates a bin structure;

FIG. 3B illustrates an optional partial usage subchannel (OPUSC) tile structure;

FIG. 3C illustrates a partial usage subchannel (PUSC) tile structure;

FIG. 4 is a block diagram showing a part of the constitution of an encoding apparatus corresponding to a decoding apparatus of the present invention;

FIG. 5 is a flowchart showing a decoding method according to an exemplary embodiment of the present invention;

FIG. 6 is a conceptual diagram illustrating a correlation metric generation process of FIG. 5 according to an exemplary embodiment of the present invention;

FIG. 7 is a conceptual diagram illustrating a decoding metric generation process of FIG. 5 according to an exemplary embodiment of the present invention;

FIG. 8 is a flowchart showing a payload determination process of FIG. 5 according to an exemplary embodiment of the present invention;

FIGS. 9 to 13 are flowcharts showing payload determination processes of FIG. 5 according to other exemplary embodiments of the present invention;

FIG. 14 is a block diagram showing a constitution of a wireless core module in a receiving end of a portable Internet radio access station (RAS), in which a decoding apparatus of the present invention can be implemented according to an exemplary embodiment of the present invention;

FIG. 15 is a block diagram of a channel estimation/compensation means constituting the decoding apparatus of FIG. 14 according to an exemplary embodiment of the present invention;

FIG. 16 is a block diagram of a demodulation/decoding means constituting the decoding apparatus of FIG. 14 according to an exemplary embodiment of the present invention;

FIG. 17 is a flowchart showing a decoding method according to another exemplary embodiment of the present invention;

FIG. 18 is a conceptual diagram illustrating a decoding metric generation process of FIG. 17 according to an exemplary embodiment of the present invention;

FIG. 19 is a flowchart showing a payload determination process of FIG. 17 according to an exemplary embodiment of the present invention;

FIGS. 20 to 24 are flowcharts showing payload determination processes of FIG. 17 according to other exemplary embodiments of the present invention; and FIG. 25 is a block diagram of a demodulation/decoding means constituting the decoding apparatus of FIG. 14 according to another exemplary embodiment of the present invention.

DESCRIPTION OF MAJOR SYMBOLS IN THE ABOVE FIGURES

50: Decoding apparatus
100: Channel estimation/compensation means
200: Demodulation/decoding means
210, 1210: Likelihood-metrics generator
220, 1220: Correlation metric generator
225, 1225: Basis vector generator
230, 1230: Correlation metric buffer
240, 1240: Decoding metric generator
245, 1245: Payload table
270, 1270: Payload determiner
280, 1280: Previous payload recorder
282: Mean calculator

DETAILED DESCRIPTION OF THE PREFERRED EMBODIMENTS

Mode for Invention

Hereinafter, exemplary embodiments of the present invention will be described in detail. However, the present invention is not limited to the exemplary embodiments disclosed below, but can be implemented in various forms. The exemplary embodiments are described so that this disclosure will enable those of ordinary skill in the art to which the invention pertains to embody and practice the invention.

For example, the spirit of the present invention can be applied to a decoding apparatus for data demodulation in a receiving end of a communication system that transmits data in a complex number signal form and, even when a received signal does not accurately agree with a determined pattern, estimates a channel using a value of the highest likelihood according to a predetermined algorithm. For the sake of convenience, the present invention is implemented in a decoding apparatus at a receiving end of a wireless portable Internet system radio access station (RAS) based on an Orthogonal Frequency Division Multiplexing (OFDM)/Orthogonal Frequency Division Multiple Access (OFDMA) scheme in the following embodiments, but the invention is not limited to such implementation.

Payload determination algorithms disclosed in exemplary embodiments below suggest various examples that can be embodied according to the spirit of the present invention. Although an algorithm suggested in detail may be modified to change the sequence of some steps and/or repeat some steps, the modified algorithm also falls within the scope of the present invention when the same result is obtained.

Exemplary Embodiment 1

The present exemplary embodiment is a wireless portable Internet system conforming to the Institute of Electrical and Electronics Engineers (IEEE) 802.16d standard or the IEEE 802.16e standard, to which the spirit of the present invention is applied. In particular, the wireless portable Internet system is implemented for transmission of a fast feedback signal. To be specific, subchannels for fast feedback signal transmission through which a 6-bit payload is transmitted by 48 subcarriers are considered in this exemplary embodiment. Each fast feedback subchannel consists of one OFDM/OFDMA subchannel allocated to a portable subscriber station (PSS), and each OFDMA subchannel is mapped by a method similar to general uplink data mapping.

In the wireless portable Internet system employing the OFDM/OFDMA scheme all transmission frames on a wireless channel, through which data communication is performed between one RAS and a plurality of PSSs, have the structure shown in FIG. 2. The illustrated frame, to which a time division method (TDM) is applied for 5 ms, is divided into an uplink section containing data to be transmitted from the PSSs to the RAS and a downlink section containing data to be transmitted from the RAS to the PSSs.

According to the IEEE 802.16e standard and the IEEE 802.16d standard, a fast feedback signal is transmitted by a quadrature phase shift keying (QPSK) modulation signal distributed to 48 subcarriers (24 subcarriers for an ACK/NACK signal) constituting a subchannel allocated to each PSS. A fast feedback subchannel uses QPSK modulation having 48 subcarriers and can carry 6-bit fast feedback data. The 48 subcarriers may be obtained from 6 optional partial usage of subchannel (OPUSC) tiles, 6 partial usage subchannel (PUSC) tiles, or another zone such as an adaptive modulation and coding (AMC) zone.

FIG. 2 illustrates a structure of an uplink/downlink frame of a wireless portable Internet system conforming to the standards IEEE 802.16d or IEEE 802.16e. The illustrated frame is divided into an uplink frame and a downlink frame. The downlink frame comprises a PUSC zone, a PUSC, OPUSC, FUSC subchannel zone, and an AMC subchannel zone, and the uplink frame comprises an upstream control symbol zone, a diversity subchannel zone, and an AMC subchannel zone.

Each zone is used to transmit data on each PSS or control signals and selected according to its usage.

In the frame of FIG. 2, tiles and bins are used as a transmission unit for dividing and transferring data. The tiles and bins consist of subcarriers corresponding to one period capable of carrying one phase signal. A bin is a data transmission unit consisting of subcarriers having 9 sequential frequencies at the same point of time, as illustrated in FIG. 3A, and uses a subcarrier having an intermediate frequency to transmit a pilot signal. The tiles may be OPUSC tiles and/or PUSC tiles. The OPUSC tile consists of 9 subcarriers defined by combinations of 3 frequency units and 3 time units, as illustrated in FIG. 3B, and uses one center subcarrier to transmit a pilot signal. The PUSC tile consists of 12 subcarriers defined by 4 frequency units and 3 time units, as illustrated in FIG. 3C, and uses 4 subcarriers at the angular points to transmit a pilot signal.

Among many kinds of signals transmitted during operation of the wireless portable Internet, the fast feedback signal and the ACK/NACK signal can be transmitted by a QPSK modulation scheme according to this exemplary embodiment. The signals are payloads having a size of 1 bit, 3 bits, 4 bits, 5 bits or 6 bits according to a kind specified in the IEEE 802.16d standard, the IEEE 802.16e standard, or other standards (needless to say, the present invention can be applied to other standards using payloads having other numbers of bits). In the case of the fast feedback signal, the number of subcarriers of one PSS for carrying the payloads is specified to be 48 in the standards. In addition, in order to ensure 48 subcarriers, it is specified that one subchannel includes 6 tiles. In addition, in the case of a 1 bit ACK/NACK signal, the subchannel of one PSS for carrying the payloads is specified to consist of 3 tiles in the standards IEEE 802.16d or IEEE 802.16e.

FIG. 4 illustrates the structure of an encoder of a PSS constituting a wireless Internet system. The illustrated encoder comprises an input buffer 620 for receiving 6-bit data to be encoded, and a mapping block 640 for encoding the data latched in the input buffer 620 according to a predetermined algorithm. The 6-bit data is input from a control signal generator 720.

The input 6-bit value is symbol-mapped onto 6 vector indices capable of filling 6 tiles. 6 vector indices corresponding to respective input 6-bit values are shown in Table 1 below. The index numbers "0" to "7" representing tile values in Table 1 are denoted by sets of vectors shown in Table 2 below. Each vector is denoted by 4 complex numbers having a phase difference of 90 degrees, as shown in Formulae 1 below, and is physically applied to a subcarrier.

TABLE 1

| 6-bit payload | Vector indices |
| --- | --- |
| 000000 | 0, 0, 0, 0, 0, 0 |
| 000001 | 1, 1, 1, 1, 1, 1 |
| 000010 | 2, 2, 2, 2, 2, 2 |
| 000011 | 3, 3, 3, 3, 3, 3 |
| 000100 | 4, 4, 4, 4, 4, 4 |
| 000101 | 5, 5, 5, 5, 5, 5 |
| 000110 | 6, 6, 6, 6, 6, 6 |
| 000111 | 7, 7, 7, 7, 7, 7 |
| 001000 | 2, 4, 3, 6, 7, 5 |
| 001001 | 3, 5, 2, 7, 6, 4 |
| 001010 | 0, 6, 1, 4, 5, 7 |
| 001011 | 1, 7, 0, 5, 4, 6 |
| 001100 | 6, 0, 7, 2, 3, 1 |
| 001101 | 7, 1, 6, 3, 2, 0 |
| 001110 | 4, 2, 5, 0, 1, 3 |
| 001111 | 5, 3, 4, 1, 0, 2 |
| 010000 | 4, 3, 6, 7, 5, 1 |
| 010001 | 5, 2, 7, 6, 4, 0 |
| 010010 | 6, 1, 4, 5, 7, 3 |
| 010011 | 7, 0, 5, 4, 6, 2 |

TABLE 1-continued

| 6-bit payload | Vector indices |
|---|---|
| 010100 | 0, 7, 2, 3, 1, 5 |
| 010101 | 1, 6, 3, 2, 0, 4 |
| 010110 | 2, 5, 0, 1, 3, 7 |
| 010111 | 3, 4, 1, 0, 2, 6 |
| 011000 | 3, 6, 7, 5, 1, 2 |
| 011001 | 2, 7, 6, 4, 0, 3 |
| 011010 | 1, 4, 5, 7, 3, 0 |
| 011011 | 0, 5, 4, 6, 2, 1 |
| 011100 | 7, 2, 3, 1, 5, 6 |
| 011101 | 6, 3, 2, 0, 4, 7 |
| 011110 | 5, 0, 1, 3, 7, 4 |
| 011111 | 4, 1, 0, 2, 6, 5 |
| 100000 | 6, 7, 5, 1, 2, 4 |
| 100001 | 7, 6, 4, 0, 3, 5 |
| 100010 | 4, 5, 7, 3, 0, 6 |
| 100011 | 5, 4, 6, 2, 1, 7 |
| 100100 | 2, 3, 1, 5, 6, 0 |
| 100101 | 3, 2, 0, 4, 7, 1 |
| 100110 | 0, 1, 3, 7, 4, 2 |
| 100111 | 1, 0, 2, 6, 5, 3 |
| 101000 | 7, 5, 1, 2, 4, 3 |
| 101001 | 6, 4, 0, 3, 5, 2 |
| 101010 | 5, 7, 3, 0, 6, 1 |
| 101011 | 4, 6, 2, 1, 7, 0 |
| 101100 | 3, 1, 5, 6, 0, 7 |
| 101101 | 2, 0, 4, 7, 1, 6 |
| 101110 | 1, 3, 7, 4, 2, 5 |
| 101111 | 0, 2, 6, 5, 3, 4 |
| 110000 | 5, 1, 2, 4, 3, 6 |
| 110001 | 4, 0, 3, 5, 2, 7 |
| 110010 | 7, 3, 0, 6, 1, 4 |
| 110011 | 6, 2, 1, 7, 0, 5 |
| 110100 | 1, 5, 6, 0, 7, 2 |
| 110101 | 0, 4, 7, 1, 6, 3 |
| 110110 | 3, 7, 4, 2, 5, 0 |
| 110111 | 2, 6, 5, 3, 4, 1 |
| 111000 | 1, 2, 4, 3, 6, 7 |
| 111001 | 0, 3, 5, 2, 7, 6 |
| 111010 | 3, 0, 6, 1, 4, 5 |
| 111011 | 2, 1, 7, 0, 5, 4 |
| 111100 | 5, 6, 0, 7, 2, 3 |
| 111101 | 4, 7, 1, 6, 3, 2 |
| 111110 | 7, 4, 2, 5, 0, 1 |
| 111111 | 6, 5, 3, 4, 1, 0 |

TABLE 2

| Vector index | Subcarrier modulated value |
|---|---|
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

Formulae 1

$$P0 = \exp\left(j \cdot \frac{\pi}{4}\right)$$

$$P1 = \exp\left(j \cdot \frac{3\pi}{4}\right)$$

$$P2 = \exp\left(-j \cdot \frac{3\pi}{4}\right)$$

$$P3 = \exp\left(-j \cdot \frac{\pi}{4}\right)$$

According to Tables 1 and 2, one input 6-bit value is converted into 6 tile values, each tile value consists of a set of 8 vectors, and each vector is carried by one subcarrier. Consequently, one input 6-bit value is carried by 48 subcarriers, i.e., 6*8=48. Table 3 below shows the relation in further detail.

TABLE 3

| 6-bit payload | 48 data subcarriers |
|---|---|
| 000000 | 1+i −1+i −1−i 1−i 1+i−1+i−1−i 1−i 1+i −1+i −1−i 1−i 1+i −1+i − 1−i 1−i 1+i −1+i −1−i 1−i 1+i −1+i −1−i 1−i 1+i −1+i −1−i 1−i 1+i −1+i −1−i 1−i 1+i −1+i −1−i 1−i 1+i −1+i −1−i 1−i 1+i −1+i −1−i 1−i |
| 000001 | 1+i 1−i −1−i −1+i 1+i 1−i −1−i −1+i 1+i 1−i −1−i −1+i 1− i −1−i −1+i 1+i 1−i −1−i −1+i 1+i 1−i −1−i −1+i 1−i −1− i −1+i 1+i 1−i −1−i −1+i 1+i 1−i −1−i −1+i 1+i 1−i −1−i −1+ i 1+i 1−i −1−i −1+i 1+i 1−i −1−i −1 +i |
| 000010 | 1+i 1+i −1+i −1+i −1−i −1−i 1−i 1−i 1+i 1+i −1+i −1+i −1−i − 1−i 1−i 1−i 1+i 1+i −1+i −1+i −1−i −1+i 1+i 1−i −1+i −1−i 1−i 1−i 1+i 1+i −1+i −1+i −1−i − 1−i 1−i 1−i 1+i 1+i −1+i 1 +i −1+i −1−i −1−i −1−i 1−i 1 −i |
| 000011 | 1+i 1+i 1−i 1−i −1−i −1 −i −1+i −1+i 1+i 1+i 1−i 1−i −1−i −1− i −1+i −1+i 1+i 1 +i 1−i 1−i −1−i −1 −i −1+i −1+i 1+i 1+i 1−i 1−i −1−i −1−i −1+i −1+i 1+i 1+i 1−i 1−i −1−i −1−i −1+i −1+ i 1+i 1 −i 1 −i −1−i −1−i −1+i −1+i 1−i 1−i −1−i −1−i −1+i −1+ i −1 +i |
| 000100 | 1+i 1+i 1+i 1+i 1+i 1+i 1+i 1+i 1+i 1+i 1+i 1+i 1+ i 1+i 1+i 1+i 1+i 1 +i 1+i 1+i 1+i 1+i 1+i 1+ i 1+i 1+i 1+i 1 +i 1+i 1+i 1+i 1+i 1+ i 1+i 1+i 1+i 1+i 1 +i 1+i 1+i 1+i 1+i 1+i 1+i 1+i 1+i 1+i 1+i |
| 000101 | 1+i −1−i 1+i −1−i 1+i −1− i 1+i −1−i 1+i −1−i 1+i −1−i 1+i − 1−i 1+i 1+i −1−i 1+i −1−i 1+i −1−i 1+i −1−i 1+ i 1+i −1−i 1+i −1−i 1+i −1−i 1+i −1−i 1+i −1−i 1+i −1−i 1+i −1−i 1+i −1− i 1+i −1−i 1+i −1−i 1+i −1−i |
| 000110 | 1+i −1−i 1+i −1−i −1−i 1+i −1−i 1+i 1+i −1−i 1 −i −1−i 1+i −1−i 1 +i 1+i −1−i −1−i 1+i −1−i 1+i 1+i −1−i 1+i −1−i 1+i −1−i −1−i 1+i −1−i 1+i 1+i −1−i −1−i 1+i −1−i 1+i 1+i −1−i 1+i −1−i −1 −i 1+i −1−i 1+i 1+i −1−i |
| 000111 | 1+i −1−i −1−i 1+i −1−i 1+i 1+i −1−i 1+i −1−i −1−i 1+i −1−i 1+i 1+i −1−i 1+i −1−i −1−i 1+i −1−i 1+i 1+i −1−i 1+i −1−i −1−i 1+i −1−i 1+i 1+i −1−i −1−i 1+i 1+i −1−i 1+i −1−i −1−i 1+i 1 +i −1−i −1−i 1+i 1+i −1−i |
| ... | ... |
| 111110 | 1+i −1−i −1−i 1+i −1 −i 1+i −1−i 1+i 1 +i 1−i 1+i 1+i 1+ i 1+i 1+i 1+i 1+i 1+i −1−i −1 +i −1−i −1−i 1−i 1 +i −1−i −1+i −1−i −1+i 1+i − i 1−i −1+i 1−i −1 −i −i 1−i 1+i 1−i −1−i −1+i 1+i 1−i −1−i −1 +i |
| 111111 | 1 +i−1−i 1+i −1−i −1 −i 1+i −1−i 1+i 1+i −1 −i 1+i −1−i 1+i − 1−i 1 +i −1−i 1+i 1−i −1−i −1−i 1+i −1+i 1+i 1+i 1+i 1+ i 1+i 1−i −1 −i −1+i 1+i 1+i −1−i 1+i 1−i −1−i −1 +i 1+i −1+i −1−i 1−i 1 +i −1+i −1−i 1 −i |

A decoding method of the present embodiment will be described now. This exemplary embodiment may use a coherent method or a non-coherent method. In the case of the coherent method, a channel estimation/compensation process may be performed which estimates the state of the wireless channel using pilot signals before decoding, and compensates a signal received through the wireless channel according to the estimation result.

More specifically, as illustrated in FIG. 5, a decoding process of this exemplary embodiment comprises the steps of: receiving QPSK modulated signal (step 100); applying a channel estimation result based on pilot signals to the received signal to compensate them (steps 200 and 300); performing subcarrier demodulation whereby correlation metrics are generated on the basis of the compensated received signals (step 400); generating decoding metrics indicating likelihoods between the correlation metrics and respective potential payload values (step 500); and determining a potential payload value having the largest metric among the decoding metrics or a payload determined on the basis of a previous frame as a payload according to a comparison result of the largest metric and an average metric of the decoding metrics (steps 600 and 700).

Step 200 is for estimating a wireless channel. Here, the wireless channel estimation is performed not on an entire uplink section through which one RAS receives signals but on each subchannel established between one RAS and one PSS. Therefore, the channel estimation is performed by applying not an upstream control symbol zone signal but pilot signals included in respective tiles of a subchannel zone used for communication with a specific PSS.

The pilot signals have a previously specified amplitude and a phase of 0. In step 200, the amplitude and phase of an actually received pilot signal is compared with the previously specified amplitude and phase of a pilot signal, thereby recognizing the differences. A difference in amplitude denotes the amount of attenuation of the received signal, and a difference in phase denotes the amount of delay of the received signal. When the differences are applied to the received signal sharing a wireless channel with the pilot signal, a unit reference value determining the amplitude of a received signal may be adjusted according to the amount of attenuation, and a point of time at which the received signal is recognized may be adjusted.

Here, according to the wireless portable Internet standards IEEE 802.16d or IEEE 802.16e, 6 tiles are allocated to a subchannel of one PSS for the sake of fast feedback signal transmission. Thus, the channel estimation and compensation process may be performed by applying the same compensation to the 6 tiles. However, the 6 tiles may not have a small difference in usable frequency and time slot. Therefore, it is preferable to apply a channel estimation result obtained using a pilot signal of each tile to subcarrier transmission signals of the same tile only, thereby separately performing channel estimation and compensation for the 6 tiles. Since a PUSC tile has 4 pilot signals, an average of channel estimation values obtained from the 4 pilot signals may be used for the wireless channel estimation.

As described above, a payload signal carried by 48 subcarriers constituting 6 tiles is measured after being compensated according to the channel estimation results based on the corresponding tiles, and is buffered in an input buffer comprising 6 tile buffers, thereby completing step 300.

In another implementation obtaining only real number values of compensated received signals to simplify structure, the amplitude of a received signal may be recorded as a multiple of the unit reference value determined according to the amount of attenuation.

Meanwhile, when demodulation/decoding is conventionally performed after step 300, a decoding table for 3072 subcarriers (64*48=3072) is necessary, which is a heavy burden on a processing apparatus performing decoding as well as a memory storing the table. According to the wireless portable Internet standards IEEE 802.16d or IEEE 802.16e, it is specified that 8 phase signals are transmitted by each of 6 tiles, the 48 phase signals are classified into 6 subsets consisting of 8 phase signals, each subset denotes one vector index value, and a combination of a predetermined number of vector index values denotes one payload.

Therefore, this exemplary embodiment performs demodulation with a simple structure using the tile division structure according to the wireless portable Internet standards IEEE 802.16d or IEEE 802.16e and an algorithm for generating predetermined vector indices. To this end, a correlation metric denoting likelihood between a signal received in one tile and the respective vector indices of Table 2 is obtained as data generated in the middle of the decoding process. One set of correlation metrics is generated from 6 tiles and 8 vector indices. Here, likelihood between real number values of the tiles or bins and the vector indices is referred to as index-likelihood, and likelihood between the correlation metrics and a value that may be a payload is referred to as payload-likelihood.

Step 200 of estimating a channel and step 300 of applying the estimation result to the received channel enables adoption of the coherent method requiring a simpler hardware structure and having high operation speed. Conversely, when the non-coherent method having a somewhat complex structure is adopted for the decoding process from step 400, steps 200 and 300 may be omitted.

In step 400, correlation metrics may be obtained by calculating inner products of a received signal and basis vector signals. The calculation of inner products can be performed by various well-known methods according to the purpose. According to the coherent method, there is no phase difference between two vectors whose inner product will be calculated, and thus the method can be implemented by a simpler inner-product circuit. On the other hand, the non-coherent method performing a multiplying operation on two vectors requires a more complex circuit outputting an imaginary part value as a calculation result. According to an inner product calculation or multiply method, inner products of 4 signals indicating a subcarrier angle of 90 degrees and a received signal are calculated, or the 4 signals are multiplied by the received signal, and the 4 calculation results are combined into subcarrier demodulation basis vector patterns, thereby obtaining a calculation result based on 8 basis vectors.

There are 3 methods of recording the calculation result having an imaginary part as a correlation metric. One of the 3 methods records the real value of the calculation result alone, another method records the absolute value of the calculation result alone, and the other method records the sum of the real value and the imaginary value of the calculation result.

The correlation metric generation process performed in step 400 and applied to the wireless portable Internet conforming to the IEEE 802.16d or IEEE 802.16e standard will be described below with reference to FIG. 6.

Received signals, each of which has one of 4 values of Formulae 1, carried by 48 subcarriers are referred to as received signal Nos. 0 to 47 in order of the corresponding subcarriers. According to the standards IEEE 802.16d or IEEE 802.16e, the 48 received signals are carried by 6 tiles specified as tiles #0 to #5, that is, 8 signals per tile.

In this exemplary embodiment, first, demodulation and first decoding is performed on 8 values stored in each tile buffer to generate correlation metrics (step 400), and then second decoding is performed using the correlation metrics (step 500).

For the sake of convenience in describing processes of generating and using the correlation metrics, they are arranged in a 6*8 matrix in FIG. 6, and a demodulation process for tile buffer #0 alone among 6 tile buffers specified as tile buffers #0 to #5 is illustrated.

In step 400, as illustrated in FIG. 6, inner products of a value buffered in tile buffer #0 and the basis vector signals are calculated, or the value is multiplied by the basis vector signals, and then the result values are summed up to generate a correlation metric. Since the correlation metric generation process is performed once per combination of a value recorded in tile buffer #0 and 8 basis vector signals having the patterns of Table 2 above, a total of 8 correlation metrics are generated as the result of the process. The 8 result values m00 to m07 constitute a first column of correlation metrics.

In the same way, 8 result values m10 to m17 obtained by demodulating values recorded in tile buffer #1 constitute a second column of the correlation metrics.

This process is repeated until tile buffer #5 is processed, and 8 result values m50 to m57 obtained by demodulating values recorded in last tile buffer #5 constitute a sixth column of the correlation metrics.

Each metric constituting the correlation metrics generated as described above denotes a probability of a vector index of the metric being an order of a row in each tile denoted by an order of a column. For example, m02 among the correlation metrics of FIG. 6 denotes an index-likelihood corresponding to a probability of a signal carried by tile No. 0 indicating vector No. 2, and m25 denotes an index-likelihood corresponding to a probability of a signal carried by tile No. 2 indicating vector No. 5. In the process of generating the correlation metrics, a vector index having the largest index-likelihood is not determined, but index-likelihoods based on 8 vector indices are recorded in the correlation metrics. This enables accurate estimation of a signal from all 48 real number values by the following process of calculating a decoding metric, even when more signal distortions occur.

In step 500, the step of distinguishing a subset used to generate a decoding metric on the basis of the correlation metrics and a specific potential payload value among the components of the correlation metrics, and the step of summing up values of the distinguished subset and calculating a decoding metric based on the potential payload value are repeated for all potential payload values, thereby generating decoding metrics.

The decoding metric generation process performed in step 500 and applied to the wireless portable Internet conforming to the IEEE 802.16d or IEEE 802.16e standard will be described below with reference to FIG. 7.

In step 500, a payload-likelihood of the final decoding value being a specific payload is calculated using values recorded as the correlation metrics. The calculated payload-likelihood is recorded as a decoding metric, and decoding metrics illustrated in FIG. 7 may be generated by calculating payload-likelihoods of respective potential payload value Nos. 0 to 63 on the basis of received signals of 6 tiles. During the process of generating the decoding metrics, a payload table showing the relation of Table 1 may be used.

The payload table, in which vector indices for the respective potential payload values are recorded, may be implemented by recording a vector index row in the case of a payload being 0 in a first row, a vector index row in the case of a payload being 1 in a second row, and so on. Therefore, the payload table has 64 rows when a 6-bit payload is carried, and 16 rows when a 4-bit payload is carried. Table 4 below is an exemplary embodiment of a payload table for a 6-bit payload.

TABLE 4

| Table index | Recorded value | 0 | 0 | 0 | 0 |
|---|---|---|---|---|---|
| 1 | 1 | 1 | 1 | 1 | 1 |
| 2 | 2 | 2 | 2 | 2 | 2 |
| 3 | 3 | 3 | 3 | 3 | 3 |
| 4 | 4 | 4 | 4 | 4 | 4 |
| 5 | 5 | 5 | 5 | 5 | 5 |
| 6 | 6 | 6 | 6 | 6 | 6 |
| 7 | 7 | 7 | 7 | 7 | 7 |
| 2 | 4 | 3 | 6 | 7 | 5 |
| 3 | 5 | 2 | 7 | 6 | 4 |
| 0 | 6 | 1 | 4 | 5 | 7 |
| 1 | 7 | 0 | 5 | 4 | 6 |
| 6 | 0 | 7 | 2 | 3 | 1 |

TABLE 4-continued

| Table index | Recorded value | 0 | 0 | 0 | 0 |
|---|---|---|---|---|---|
| 7 | 1 | 6 | 3 | 2 | 0 |
| 4 | 2 | 5 | 0 | 1 | 3 |
| 5 | 3 | 4 | 1 | 0 | 2 |
| 4 | 3 | 6 | 7 | 5 | 1 |
| 5 | 2 | 7 | 6 | 4 | 0 |
| 6 | 1 | 4 | 5 | 7 | 3 |
| 7 | 0 | 5 | 4 | 6 | 2 |
| 0 | 7 | 2 | 3 | 1 | 5 |
| 1 | 6 | 3 | 2 | 0 | 4 |
| 2 | 5 | 0 | 1 | 3 | 7 |
| 3 | 4 | 1 | 0 | 2 | 6 |
| 3 | 6 | 7 | 5 | 1 | 2 |
| 2 | 7 | 6 | 4 | 0 | 3 |
| 1 | 4 | 5 | 7 | 3 | 0 |
| 0 | 5 | 4 | 6 | 2 | 1 |
| 7 | 2 | 3 | 1 | 5 | 6 |
| 6 | 3 | 2 | 0 | 4 | 7 |
| 5 | 0 | 1 | 3 | 7 | 4 |
| 4 | 1 | 0 | 2 | 6 | 5 |
| 6 | 7 | 5 | 1 | 2 | 4 |
| 7 | 6 | 4 | 0 | 3 | 5 |
| 4 | 5 | 7 | 3 | 0 | 6 |
| 5 | 4 | 6 | 2 | 1 | 7 |
| 2 | 3 | 1 | 5 | 6 | 0 |
| 3 | 2 | 0 | 4 | 7 | 1 |
| 0 | 1 | 3 | 7 | 4 | 2 |
| 1 | 0 | 2 | 6 | 5 | 3 |
| 7 | 5 | 1 | 2 | 4 | 3 |
| 6 | 4 | 0 | 3 | 5 | 2 |
| 5 | 7 | 3 | 0 | 6 | 1 |
| 4 | 6 | 2 | 1 | 7 | 0 |
| 3 | 1 | 5 | 6 | 0 | 7 |
| 2 | 0 | 4 | 7 | 1 | 6 |
| 1 | 3 | 7 | 4 | 2 | 5 |
| 0 | 2 | 6 | 5 | 3 | 4 |
| 5 | 1 | 2 | 4 | 3 | 6 |
| 4 | 0 | 3 | 5 | 2 | 7 |
| 7 | 3 | 0 | 6 | 1 | 4 |
| 6 | 2 | 1 | 7 | 0 | 5 |
| 1 | 5 | 6 | 0 | 7 | 2 |
| 0 | 4 | 7 | 1 | 6 | 3 |
| 3 | 7 | 4 | 2 | 5 | 0 |
| 2 | 6 | 5 | 3 | 4 | 1 |
| 1 | 2 | 4 | 3 | 6 | 7 |
| 0 | 3 | 5 | 2 | 7 | 6 |
| 3 | 0 | 6 | 1 | 4 | 5 |
| 2 | 1 | 7 | 0 | 5 | 4 |
| 5 | 6 | 0 | 7 | 2 | 3 |
| 4 | 7 | 1 | 6 | 3 | 2 |
| 7 | 4 | 2 | 5 | 0 | 1 |
| 6 | 5 | 3 | 4 | 1 | 0 |

The process of generating the decoding metrics will now be described in detail. Unit values constituting one row of the payload table of Table 4 are read. Among components having the same column orders as column orders of the respective unit values in correlation metrics of Table 5 below, components in row orders corresponding to the respective unit values are selected. When a total of 6 components are selected from the correlation metrics, they are summed up, and a payload-likelihood of a payload value denoted by the read row is calculated. For example, when a first row of the payload table is applied, values corresponding to m00, m10, m20, m30, m40 and m50 among the components of the correlation metrics of Table 5 are summed up, and when a ninth row of the payload table is applied, values corresponding to m02, m14, m23, m36, m47 and m55 are summed up.

TABLE 5

| m00 | m10 | m20 | m30 | m40 | m50 |
| m01 | m11 | m21 | m31 | m41 | m51 |

TABLE 5-continued

| m02 | m12 | m22 | m32 | m42 | m52 |
| m03 | m13 | m23 | m33 | m43 | m53 |
| m04 | m14 | m24 | m34 | m44 | m54 |
| m05 | m15 | m25 | m35 | m45 | m55 |
| m06 | m16 | m26 | m36 | m46 | m56 |
| m07 | m17 | m27 | m37 | m47 | m57 |

In step 600, the largest one and/or second largest one of the decoding metrics generated in step 500 are/is retrieved, and an average metric is calculated.

The average metric may be obtained by averaging the largest metrics determined in decoding processes for previous frames, or the decoding metrics of the current frame. In the both cases, a geometric average of metrics may be obtained as the average metric, but it is preferable for convenience of calculation, etc., to obtain an arithmetic average. Otherwise, all sets of decoding metrics of all previous frames may be averaged, or all sets of decoding metrics of all previous frames and the current frame may be averaged. Even while using all sets of decoding metrics of all previous frames and/or the current frame as described above, only a metric exceeding a predetermined reference value may be applied to the average calculation.

In step 700, a payload determination process is performed using the largest metric and the average metric. 6 methods for the process will be described in detail with reference to FIGS. 8 to 11.

According to the first method illustrated in the flowchart of FIG. 8, step 700 comprises the steps of: when the largest metric exceeds a predetermined first reference value, determining a potential value having the largest metric as a payload; if the largest metric does not exceed the first reference value, determining whether a difference between the largest metric and the average metric exceeds a predetermined second reference value or not; if the difference between the metrics exceeds the second reference value, determining the potential value having the largest metric as a payload; and if the difference does not exceed the second reference value, determining the payload of a previous frame as a payload.

In illustrated step 710, if the largest metric is larger than the predetermined first reference value, it is determined that likelihood is sufficient, and the potential payload value of the largest metric is determined as a payload. If the difference between the largest metric and the second largest metric exceeds the predetermined second reference value, although the largest metric is smaller than or equal to the first reference value, it is determined that the likelihood of the largest metric is sufficient, and the potential payload value of the largest metric is determined as a payload. If either of the 2 conditions is not satisfied, it is determined that the largest metric does not have superior likelihood with respect to a specific potential value because noise is added to the received signal, and the payload obtained from a previous frame is determined as a current payload instead of determining a payload of the frame including the received signal. This is because control data has a low probability of change according to frames. Thus, in case it is difficult to detect a correct signal in a frame, control data of a previous frame needs to be kept. An algorithm of FIG. 8 is expressed in programming language as follows:

Decision

```
Find Max(K) and compute the average of the Max(K)
if Max(K)>Threshold
    Make decision
elseif (Max(K)–avg_Max(K))>Threshold_second
    Make Decision
```

Decision

```
else
    Payload = Payload_PreviousFrame
end
```

Figure 9:
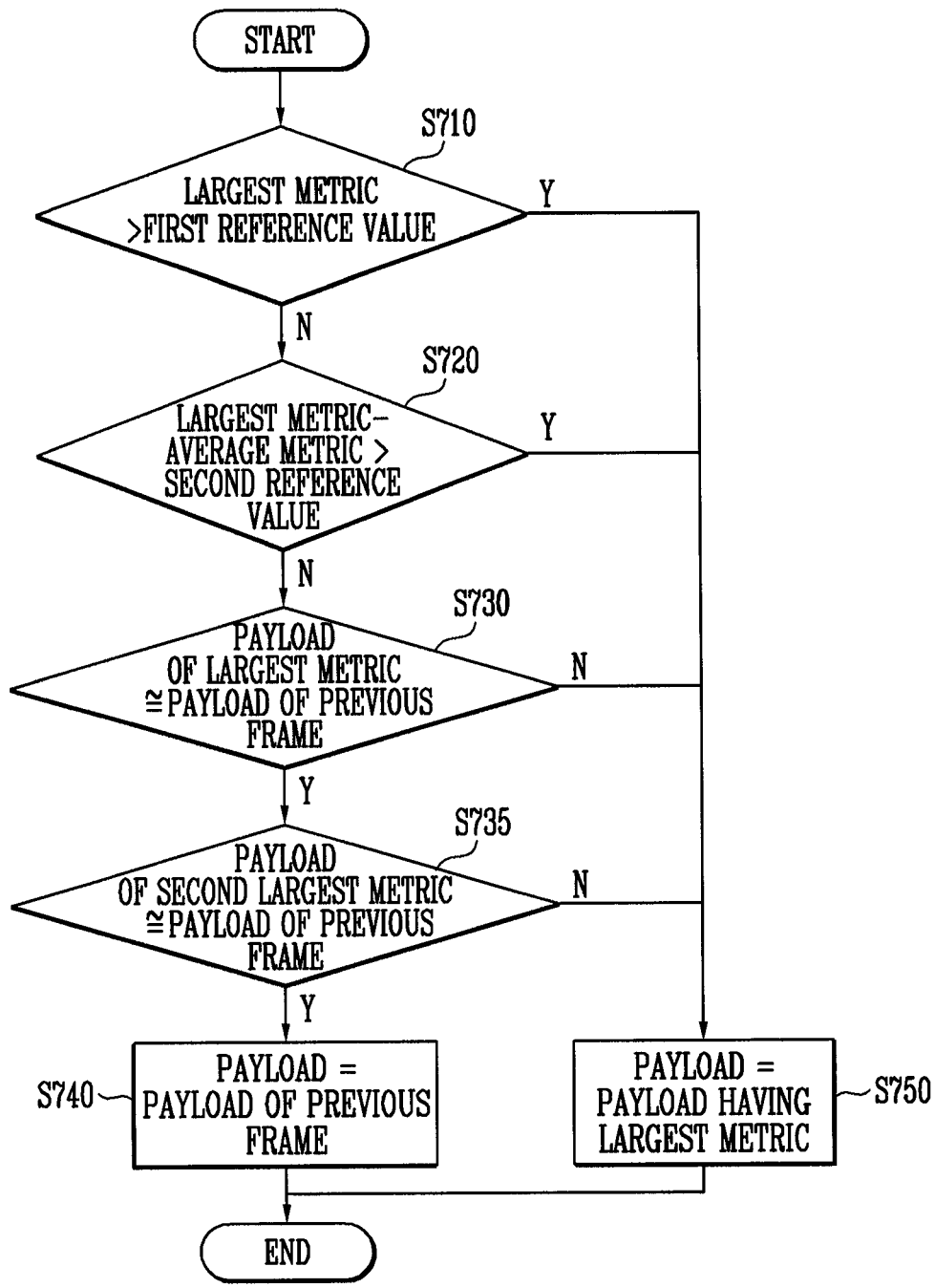

According to the second method illustrated in the flowchart of FIG. 9, step 700 comprises the steps of: if the largest metric exceeds a predetermined first reference value, determining a potential value having the largest metric as a payload; if the largest metric does not exceed the first reference value, determining whether a difference between the largest metric and the average metric exceeds a predetermined second reference value or not; if the difference between the metrics exceeds the second reference value, determining the potential value having the largest metric as a payload; if the difference does not exceed the second reference value, determining whether the potential value having the largest metric and another potential value having the second largest metric are similar to the payload of a previous frame within a predetermined range or not; if they are similar to the payload within the predetermined range, determining the payload of the previous frame as a payload; and if they are not similar to the payload within the predetermined range, determining the potential value having the largest metric as a payload.

According to the second method of FIG. 9, if it is determined in step 720 that the difference does not exceed the second reference value, it is determined in step 730 whether the payload of the largest metric is similar to the payload of the previous frame within the predetermined range, and in step 735 whether the payload of the second largest metric is similar to the payload of the previous frame within the predetermined range. Here, the similarity range includes 4 margins, i.e., a margin increasing more than the reference value, a margin decreasing less than the reference value, a margin versus the largest metric, and a margin versus the second largest metric. The 4 margins may have different values, but it is preferable for simplification of structure to give the same value to the 4 margins. If the potential values having the largest metric and the second largest metric are similar to the payload of the previous frame within a predetermined range, it is determined that there is no change in control data between the previous frame and the current frame, and the payload of the previous frame is determined as a payload in step 740. Otherwise, the payload of the largest metric is determined as a payload in step 750.

Figure 10:
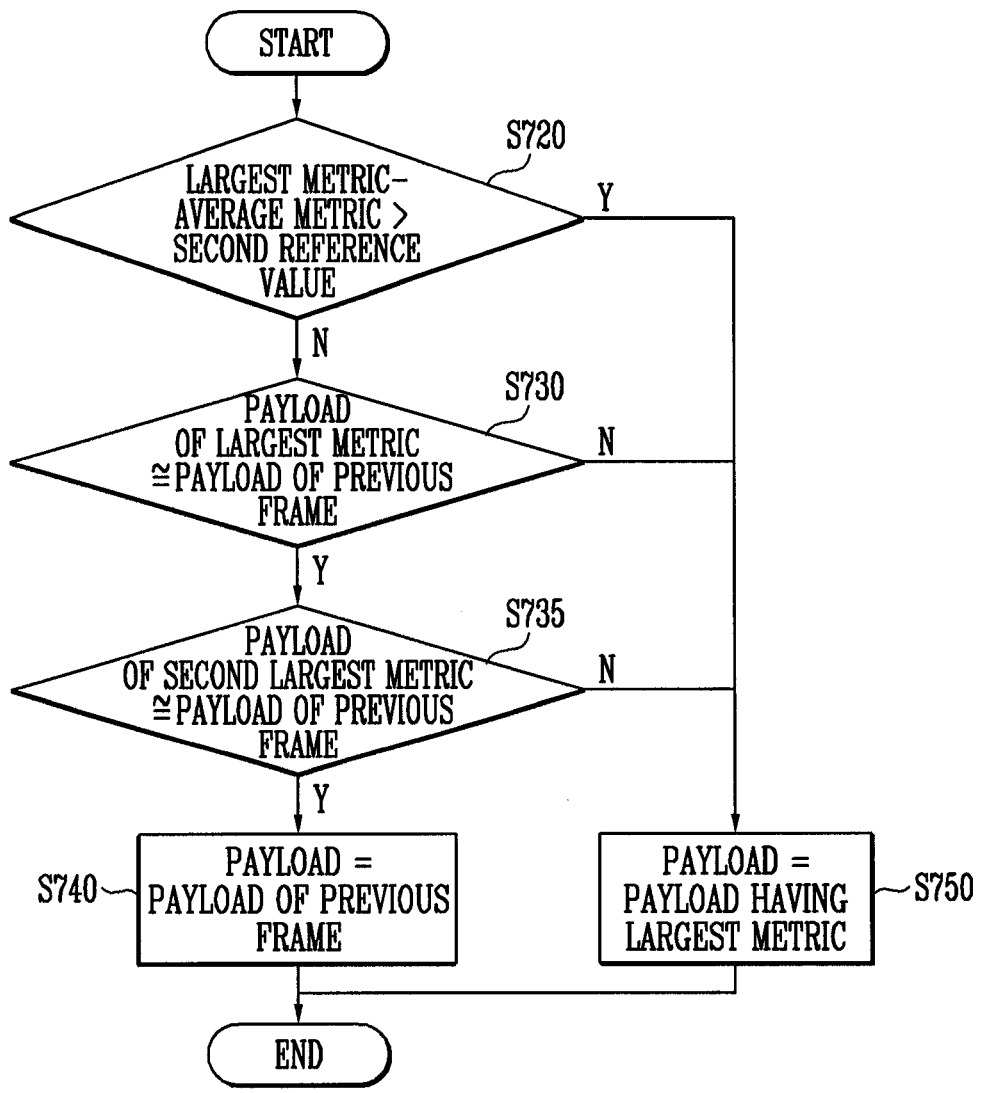

According to the third method illustrated in the flowchart of FIG. 10, step 700 comprises the steps of: if a difference between the largest metric and the average metric exceeds a predetermined second reference value, determining a potential value having the largest metric as a payload; if the difference does not exceed the second reference value, determining whether the potential value having the largest metric and another potential value having the second largest metric are similar to the payload of a previous frame within a predetermined range; if they are similar to the payload within the predetermined range, determining the payload of the previous frame as a payload; and if they are not similar to the payload within the predetermined range, determining the potential value having the largest metric as a payload. Since the illustrated flowchart is the same as that shown in FIG. 9, except that step 710 is omitted, a description thereof will not be reiterated. An algorithm of FIG. 10 is expressed in programming language as follows:

```
Decision

Find Max(K), get the payload and second_payload and compute
    Avg_max(K)
if(Max(K)-Avg_max(K))>Threshold
    Make decision
elseif (payload ~= payload_PreviousFrame & second_payload ==
Payload_previousFrame)
    Payload = Payload_PreviousFrame
Else
    Payload = Payload_CurrentFrame
end
```

Figure 11:
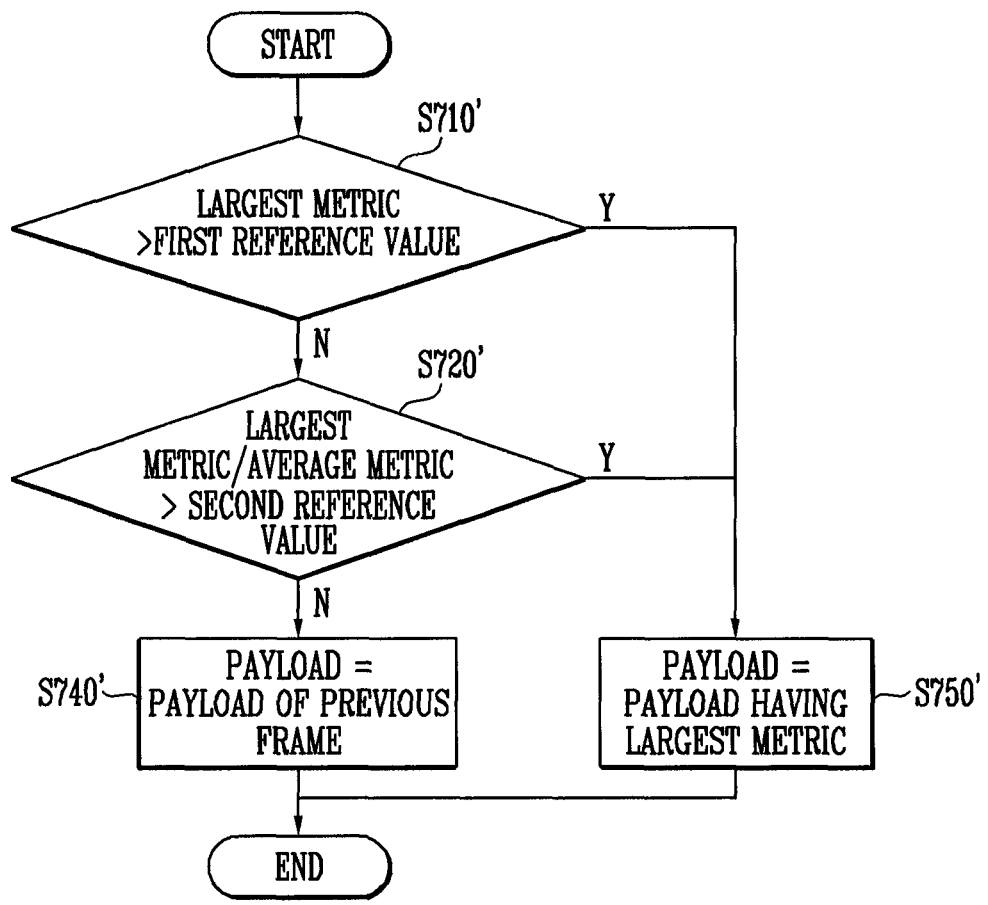

According to the fourth method illustrated in the flowchart of FIG. 11, step 700 comprises the steps of: if the largest metric exceeds a predetermined first reference value, determining a potential value having the largest metric as a payload; if the largest metric does not exceed the first reference value, determining whether a quotient obtained by dividing the largest metric by the average metric exceeds a predetermined second reference value or not; if the quotient exceeds the second reference value, determining the potential value having the largest metric as a payload; and if the quotient does not exceed the second reference value, determining the payload of a previous frame as a payload.

The first method determines whether likelihood is sufficient or not according to the difference between the largest metric and the average metric, while the fourth method determines whether likelihood is sufficient or not according to the quotient obtained by dividing the largest metric by the average metric. More specifically, if the quotient exceeds the predetermined second reference value, it is determined that the likelihood of a potential payload value having the largest metric is sufficient. Except for the above mentioned, the flowchart is the same as that of the first method, and thus a description thereof will not be reiterated. An algorithm of FIG. 11 is expressed in programming language as follows:

```
Decision

Find Max(K) and compute the average of the Max(K)
if Max(K)>Threshold
    Make decision
elseif (Max(K)/avg_Max(K))>Threshold_second
    Make Decision
else
    Payload = Payload_PreviousFrame
end
```

Figure 12:
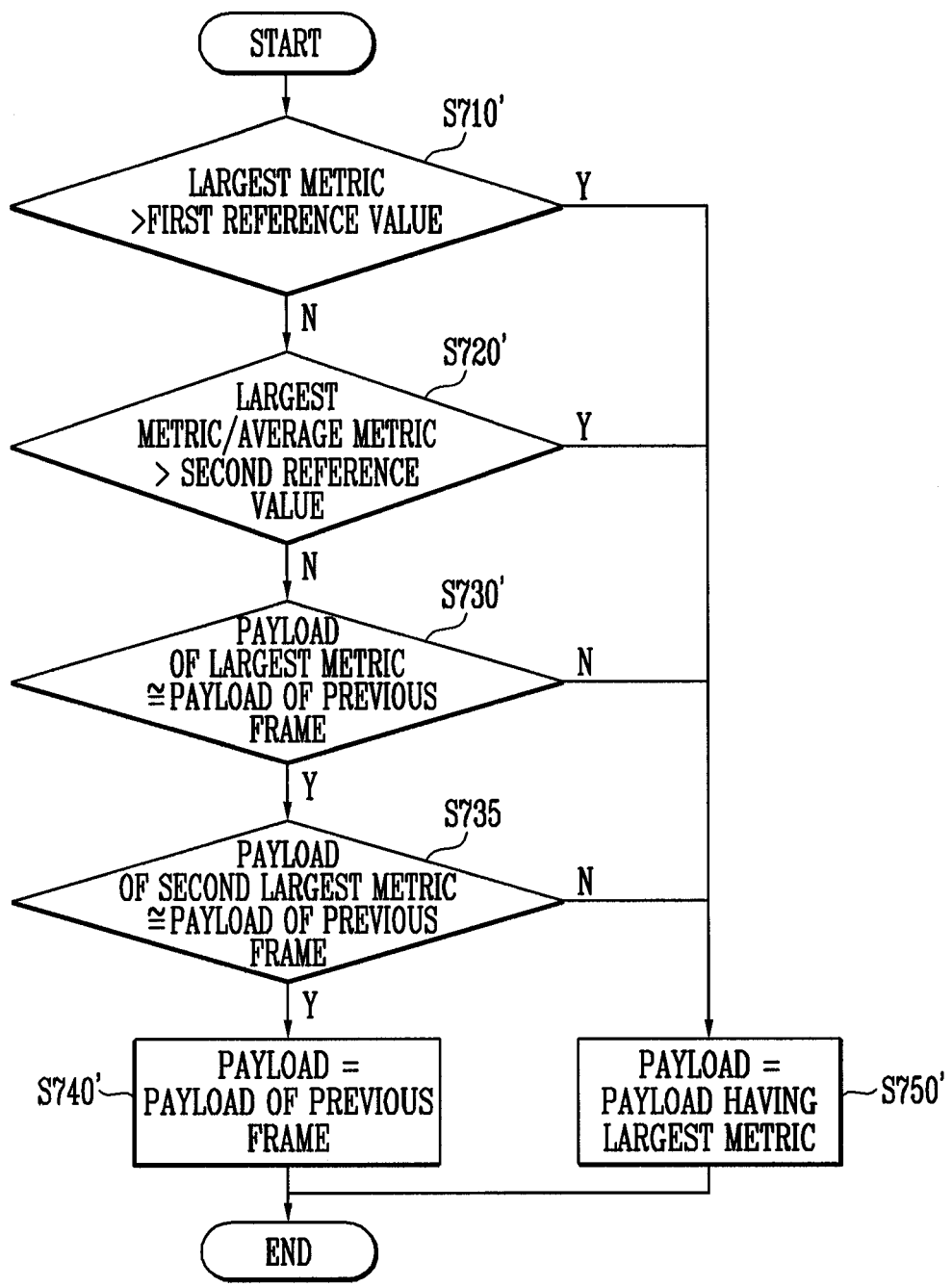

According to the fifth method illustrated in the flowchart of FIG. 12, step 700 comprises the steps of: if the largest metric exceeds a predetermined first reference value, determining a potential value having the largest metric as a payload; if the largest metric does not exceed the first reference value, determining whether a quotient obtained by dividing the largest metric by the average metric exceeds a predetermined second reference value or not; if the quotient exceeds the second reference value, determining the potential value having the largest metric as a payload; if the quotient does not exceed the second reference value, determining whether the potential value having the largest metric and another potential value having the second largest metric are similar to the payload of a previous frame within a predetermined range or not; if they are similar to the payload within the predetermined range, determining the payload of the previous frame as a payload; and if they are not similar to the payload within the predetermined range, determining the potential value having the largest metric as a payload.

The fifth method is the same as the second method, except for whether likelihood is sufficient or not is determined according to the quotient obtained by dividing the largest metric by the average metric, and thus a description thereof will not be reiterated.

Figure 13:
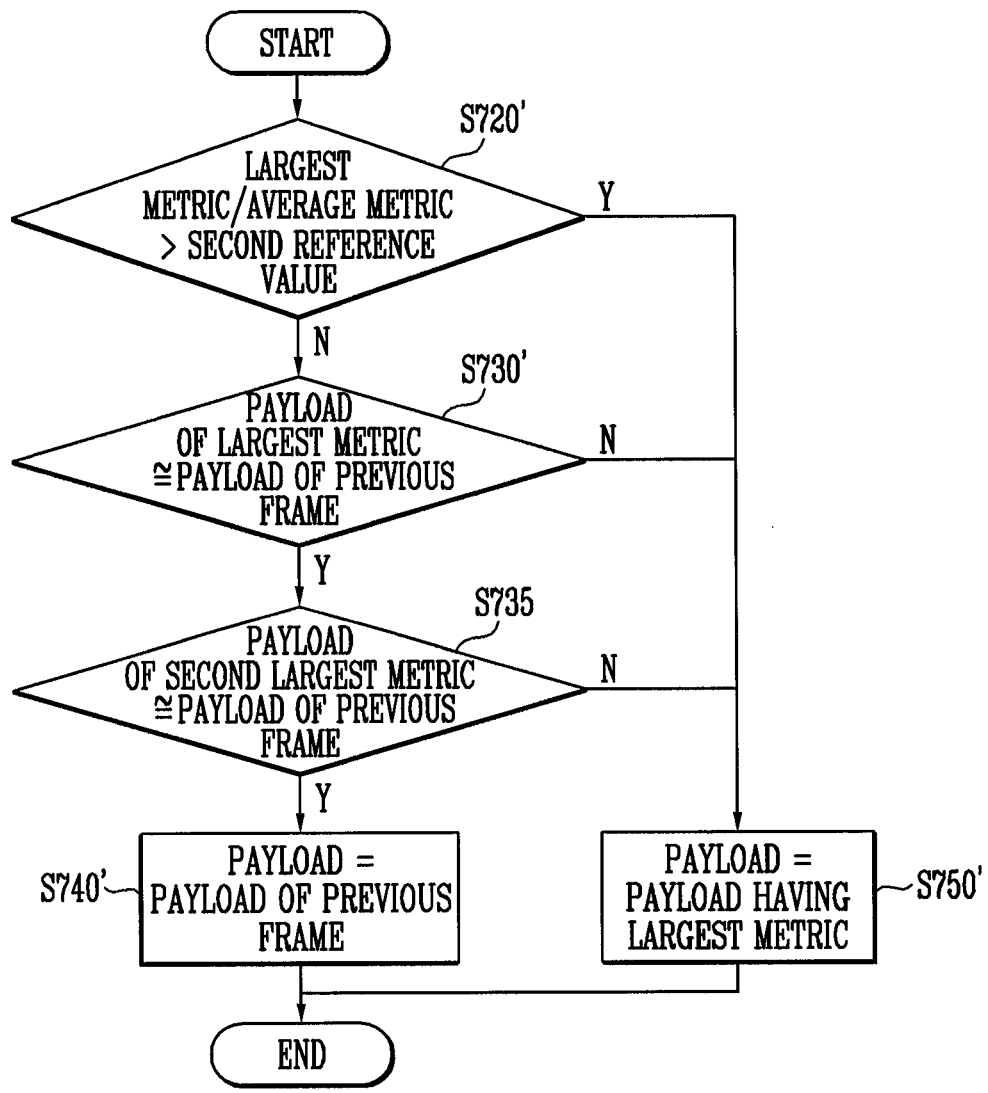

According to the sixth method illustrated in the flowchart of FIG. 13, step 700 comprises the steps of: if a quotient obtained by dividing the largest metric by the average metric exceeds a predetermined second reference value, determining a potential value having the largest metric as a payload; if the quotient does not exceed the second reference value, determining whether the potential value having the largest metric and another potential value having the second largest metric are similar to the payload of a previous frame within a predetermined range or not; if they are similar to the payload within the predetermined range, determining the payload of the previous frame as a payload; and if they are not similar to the payload within the predetermined range, determining the potential value having the largest metric as a payload. Since the illustrated flowchart is the same as that shown in FIG. 12, except that step 710' is omitted, a description thereof will not be reiterated. An algorithm of FIG. 12 is expressed in programming language as follows:

```
Decision

Find Max(K), get the payload and second_payload and compute
    Avg_max(K)
if (Max(K)/Avg_max(K))>Threshold
    Make decision
elseif (payload ~= payload_PreviousFrame & second_payload ==
Payload_previousFrame)
    Payload = Payload_PreviousFrame
Else
    Payload = Payload_CurrentFrame
end
```

FIG. 14 illustrates a constitution of a wireless core module of an RAS's receiving means before a lower media access control (MAC) layer in a portable Internet system. The portable Internet system uses a time division duplexing (TDD) scheme dividing a downlink time and an uplink time, and uses the OFDM/OFDMA scheme for multiple access. A wireless signal based on the OFDM/OFMDA scheme is received by an antenna while being carried by a plurality of subcarriers, passed through a low pass filter 20, converted into a plurality of QPSK modulation signals by a fast Fourier transform (FFT) block 40, and input into a decoding apparatus 50 of this exemplary embodiment. A payload obtained by the decoding apparatus 50 is finally transferred to a MAC layer 60. When enumeration is performed by a subchannel mapper, a de-enumerator may be further included between the decoding apparatus 50 and the MAC layer 60.

The decoding apparatus 50 of this exemplary embodiment for performing the decoding process in a system supporting the OFDM/OFDMA scheme is for estimating a payload carried by a plurality of received signals distributed to 6 tiles or bins, as shown in the drawings. The decoding apparatus 50 comprises: a wireless channel estimation/compensation means 100 for estimating a pilot signal included in each tile or bin, and compensating the received signal according to the estimating result; and a demodulation/decoding means 200 for decoding the compensated received signals of complex number format, and determining a payload.

As illustrated in FIG. 15, the wireless channel estimation/compensation means 100 implementing the spirit of the present invention may comprise: a wireless channel estimator 110 estimating the amount of attenuation and/or delay of a pilot signal included in each tile or bin; and a wireless channel compensator 160 applying the amount of attenuation to the amplitude of a data signal included in the tile or bin, or applying the delay time to the phase of the data signal.

The wireless channel estimator 110 may comprise: a signal input means 112 for receiving received signal, a pilot buffer 114 for obtaining a pilot signal among the received signals input to the signal input means 112, and a pilot channel estimator 116 for estimating the amplitude and phase of the pilot signal buffered in the pilot buffer 114. In this case, received signals, except the pilot signal input to the signal input means 112, are input to the channel compensator 160, and the channel compensator 160 compensates the input received signals according to the channel estimation result of the pilot channel estimator 116. Since the received signals are QPSK modulation signals recording data in their phases, compensation for a delay time is particularly important in a process of compensating the received signals. A point of time of signal detection may be delayed so that the delay time of the pilot signal becomes 0, thereby performing the compensation for a delay time. The compensation of the received signals is completed by recording compensated values in a receiving buffer 260 of FIG. 16 described below. In some embodiments, as the above mentioned non-coherent method, the wireless channel estimation/compensation means 110 may be omitted.

As illustrated in FIG. 16, the demodulation/decoding means 200 of this exemplary embodiment comprises: the receiving buffer 260 for buffering input QPSK-modulated signals; a likelihood metric generator 210 for generating decoding metrics corresponding to likelihoods of the received signals buffered in the receiving buffer 260 being determined as respective potential payload values; a mean calculator 282 for calculating an average metric of the decoding metrics; and a payload determiner 270 for determining a payload using the decoding metrics and the average metric. In addition, a previous payload recorder 280 storing a previous payload determined on the basis of a previous frame may be further included.

In some embodiments, the likelihood metric generator 210 may comprise: a correlation metric generator 220 for generating correlation metrics from the received signals buffered in the receiving buffer 260; and a decoding metric generator 240 for summing up respective subsets of the correlation metrics designated for all the potential payload values and generating decoding metrics. In addition, a correlation metric buffer 230 for storing the correlation metrics may be further included. In FIG. 16, the receiving buffer 260 is shown as a component included in the demodulation/decoding means 200, but from another point of view, it may be seen as a separate component from the demodulation/decoding means 200.

The receiving buffer 260 may include a plurality of tile buffers for buffering received signals according to tiles constituting a subchannel. In an exemplary embodiment according to the portable Internet standards IEEE 802.16d or IEEE 802.16e, there are 6 tile buffers from tile buffer #0 to tile buffer #5. Tile buffer #0, i.e., a buffer for tile No. 0, stores received signal Nos. 0 to 7 among 48 received signals identified by numbers from 0 to 47, tile buffer #1 stores received signal Nos. 8 to 15, and tile buffer #2 stores received signal Nos. 16 to 23. The same process is repeated in the same way, and the final buffer #5 stores received signal Nos. 40 to 47.

A basis vector generator 225 for generating basis vector signal sets required for demodulation may be further included. The basis vector generator 225 may include a demodulation table in which patterns of 8 basis vectors are recorded, and reads the pattern information of the basis vectors and generates basis vector signals required for performing demodulation. Here, the basis vectors denote values of 0 to 7, respectively. In Table 5, a result value obtained by applying a first column of the demodulation table is m00, and a result value obtained by applying an eighth, i.e., the last, column is m07.

The payload determiner 270 determines the largest metric and the second largest metric of the decoding metrics generated by the decoding metric generator 240, and determines a payload using the largest metric, the second largest metric, and an average metric calculated by the mean calculator 282 according to one of methods illustrated in FIGS. 8 to 13.

The mean calculator 282 may calculate the mean of largest metrics determined in decoding processes for previous frames or the mean of the decoding metrics of the current frame. In the former case, the mean calculator 282 may have a storage means for storing the largest metrics determined in the decoding processes for previous frames, or for storing an average metric obtained from previous frames and the number of frames required for calculating the average metric. In the latter case, the mean calculator 282 may average decoding metrics stored in a decoding metric buffer, or update the average metric every time a decoding metric is generated. In addition, the mean may be calculated by various methods as described in step 600.

In order to perform the payload determination methods illustrated in FIGS. 8 to 13, the previous payload recorder 280 for storing the payload of a previous frame may be further included. The previous payload recorder 280 stores a payload determined on the basis of the current frame.

Exemplary Embodiment 2

The present exemplary embodiment is a wireless portable Internet system conforming to the IEEE 802.16d standard or the IEEE 802.16e standard, to which the spirit of the present invention is applied. In particular, the wireless portable Internet system is implemented for transmission of a fast feedback signal.

The decoding method of this exemplary embodiment may use the coherent method or the non-coherent method. In the case of the coherent method, a channel estimation/compensation process may be performed which estimates the state of a wireless channel using pilot signals before decoding, and compensates a signal received through the wireless channel according to the estimation result.

More specifically, as illustrated in FIG. 17, the decoding process of this exemplary embodiment comprises the steps of: receiving QPSK modulated signals (step 1100); applying a channel estimation result based on pilot signals to the received signals to compensate them (steps 1200 and 1300); performing subcarrier demodulation whereby correlation metrics are generated on the basis of the compensated received signals (step 1400); generating decoding metrics indicating likelihoods between the correlation metrics and respective potential payload values (step 1500); and determining a potential payload value having the largest metric among the decoding metrics or a payload determined on the basis of a previous frame as a payload according to a comparison result between the largest metric and the second largest metric of the decoding metrics (steps 1600 and 1700).

Step 1200 is for estimating a wireless channel. Here, the wireless channel estimation is performed not on an entire uplink section through which one RAS receives signals, but on each subchannel established between one RAS and one PSS. Therefore, the channel estimation is performed by applying not an upstream control symbol zone signal, but by applying pilot signals included in respective tiles of a subchannel zone used for communication with a specific PSS.

The pilot signals have a previously specified amplitude and a phase of 0. In step 1200, the amplitude and phase of an actually received pilot signal is compared with the previously specified amplitude and phase of an ideal pilot signal, thereby recognizing the differences. A difference in amplitude denotes the amount of attenuation of the received signal, and a difference in phase denotes the amount of delay of the received signal. If the differences are applied to the received signal sharing a wireless channel with the pilot signal, a unit reference value determining the amplitude of a received signal may be adjusted according to the amount of attenuation, and a point of time at which the received signal is recognized may be adjusted.

Here, according to the wireless portable Internet standards IEEE 802.16d or IEEE 802.16e, 6 tiles are allocated to a subchannel of one PSS for the sake of fast feedback signal transmission. Thus, the channel estimation and compensation process may be performed by applying the same amount of compensation to the 6 tiles. However, the 6 tiles may not have a small difference in usable frequency and time slot. Therefore, it is preferable to apply a channel estimation result obtained using a pilot signal of each tile to subcarrier transmission signals of the same tile only, thereby separately performing channel estimation and compensation for the 6 tiles. Since a PUSC tile has 4 pilot signals, an average of channel estimation values obtained from the 4 pilot signals may be used for the wireless channel estimation.

As described above, a payload signal carried by 48 subcarriers constituting 6 tiles is measured after being compensated according to the channel estimation results based on the corresponding tiles, and is buffered in an input buffer comprising 6 tile buffers, thereby completing step 1300.

In another implementation obtaining only real number values of compensated received signals to simplify structure, the amplitude of a received signal may be recorded as a multiple of the unit reference value determined according to the amount of attenuation.

Meanwhile, when demodulation/decoding is conventionally performed after step 1300, a decoding table for 3072 subcarriers (64*48=3072) is necessary, which is a heavy burden on a processing apparatus performing decoding as well as a memory storing the table. According to the wireless portable Internet standards IEEE 802.16d or IEEE 802.16e, it is specified that 8 phase signals are transmitted by each of 6 tiles, the 48 phase signals are classified into 6 subsets consisting of 8 phase signals, each subset denotes one vector index value, and a combination of a predetermined number of vector index values denotes one payload.

Therefore, this exemplary embodiment performs demodulation with a simple structure using the tile division structure according to the wireless portable Internet standards IEEE 802.16d or IEEE 802.16e and an algorithm for generating predetermined vector indices. To this end, a correlation metric denoting likelihood between a signal received in one tile and the respective vector indices of Table 2 is obtained as data generated in the middle of the decoding process. One set of correlation metrics is generated from 6 tiles and 8 vector indices. Here, likelihood between real number values of the tiles or bins and the vector indices is referred to as index-likelihood, and likelihood between the correlation metrics and a value that may be a payload is referred to as payload-likelihood.

Step 1200 of estimating a channel and step 1300 of applying the estimation result to the received channel enables adoption of the coherent method requiring a simpler hardware structure and having high operation speed. Conversely, when the non-coherent method having a somewhat complex structure is adopted for the decoding process from step 1400, steps 1200 and 1300 may be omitted.

In step 1400, correlation metrics may be obtained by calculating inner products of a received signal and basis vector signals. The calculation of inner products can be performed by various well-known methods according to the purpose. According to the coherent method, there is no phase difference between two vectors whose inner product will be calculated, and thus the method can be implemented by a simpler inner-product circuit. On the other hand, the non-coherent method performing a multiplying operation on two vectors requires a more complex circuit outputting an imaginary part value as a calculation result. According to an inner product calculation or multiply method, inner products of 4 signals indicating a subcarrier angle of 90 degrees and a received signal are calculated, or the 4 signals are multiplied by the received signal, and the 4 calculation results are combined into subcarrier demodulation basis vector patterns, thereby obtaining a calculation result based on 8 basis vectors.

There are 3 methods of recording the calculation result having an imaginary part as a correlation metric. One of the 3 methods records the real value of the calculation result alone, another method records the absolute value of the calculation result alone, and the other method records the sum of the real value and the imaginary value of the calculation result.

The correlation metric generation process performed in step 1400 and applied to the wireless portable Internet conforming to the IEEE 802.16d or IEEE 802.16e standard will be described below with reference to FIG. 6.

Received signals, each of which has one of 4 values of Formulae 1, carried by 48 subcarriers are referred to as received signal Nos. 0 to 47 in order of the corresponding subcarriers. According to the standards IEEE 802.16d or IEEE 802.16e, the 48 received signals are carried by 6 tiles specified as tiles #0 to #5, that is, 8 signals per tile.

In this exemplary embodiment, first, demodulation and first decoding is performed on 8 values stored in each tile buffer to generate correlation metrics (step 1400), and then second decoding is performed using the correlation metrics (step 1500).

For the sake of convenience in describing processes of generating and using the correlation metrics, they are arranged in a 6*8 matrix in FIG. 6, and a demodulation process for tile buffer #0 alone among 6 tile buffers specified as tile buffers #0 to #5 is illustrated.

In step 1400, as illustrated in FIG. 6, inner products of a value buffered in tile buffer #0 and the basis vector signals are calculated, or the value is multiplied by the basis vector signals, and then the result values are summed up to generate a correlation metric. Since the correlation metric generation process is performed once per combination of a value recorded in tile buffer #0 and 8 basis vector signals having the patterns of Table 2 above, a total of 8 correlation metrics are generated as the result of the process. The 8 result values m00 to m07 constitute a first column of correlation metrics.

In the same way, 8 result values m10 to m17 obtained by demodulating values recorded in tile buffer #1 constitute a second column of the correlation metrics. This process is repeated until tile buffer #5 is processed, and 8 result values m50 to m57 obtained by demodulating values recorded in last tile buffer #5 constitute a sixth column of the correlation metrics.

Each metric constituting the correlation metrics generated as described above denotes a probability of a vector index of the metric being an order of a row in each tile denoted by an order of a column. For example, m02 among the correlation metrics of FIG. 6 denotes an index-likelihood corresponding to a probability of a signal carried by tile No. 0 indicating vector No. 2, and m25 denotes an index-likelihood corresponding to a probability of a signal carried by tile No. 2 indicating vector No. 5. In the process of generating the correlation metrics, a vector index having the largest index-likelihood is not determined, but index-likelihoods based on 8 vector indices are recorded in the correlation metrics. This enables accurate estimation of a signal from all 48 real number values by the following process of calculating a decoding metric, even if more signal distortions occur.

In step 1500, the step of distinguishing a subset used to generate a decoding metric on the basis of the correlation metrics and a specific potential payload value among the components of the correlation metrics, and the step of summing up values of the distinguished subset and calculating a decoding metric based on the potential payload value are repeated for all potential payload values, thereby generating decoding metrics.

The decoding metric generation process performed in step 1500 and applied to the wireless portable Internet conforming to the IEEE 802.16d or IEEE 802.16e standard will be described below with reference to FIG. 18.

In step 1500, a payload-likelihood of the final decoding value being a specific payload is calculated using values recorded as the correlation metrics. The calculated payload-likelihood is recorded as a decoding metric, and decoding metrics illustrated in FIG. 18 may be generated by calculating payload-likelihoods of respective potential payload value Nos. 0 to 63 on the basis of received signals of 6 tiles. During the process of generating the decoding metrics, a payload table showing the relation of Table 1 may be used.

The payload table, in which vector indices for the respective potential payload values are recorded, may be implemented by recording a vector index row in the case of a payload being 0 in a first row, a vector index row in the case of a payload being 1 in a second row, and so on. Therefore, the payload table has 64 rows when a 6-bit payload is carried, and 16 rows when a 4-bit payload is carried. Table 4 is an exemplary embodiment of a payload table for a 6-bit payload.

In step 1600, the largest metric and the second largest metric among the decoding metrics generated in step 1500 are determined according to the spirit of the present invention. In step 1700, a payload determination process is performed using the largest metric and the second largest metric. 6 methods for the process will be described in detail with reference to FIGS. 8 to 11.

According to the first method illustrated in the flowchart of FIG. 19, step 1700 comprises the steps of: if the largest metric exceeds a predetermined first reference value, determining a potential value having the largest metric as a payload; if the largest metric does not exceed the first reference value, determining whether a difference between the largest metric and the second largest metric exceeds a predetermined second reference value or not; if the difference between the metrics exceeds the second reference value, determining the potential value having the largest metric as a payload; and if the difference does not exceed the second reference value, determining the payload of a previous frame as a payload.

In illustrated step 1710, if the largest metric is larger than the predetermined first reference value, it is determined that likelihood is sufficient, and the potential payload value of the largest metric is determined as a payload. If the difference between the largest metric and the second largest metric exceeds the predetermined second reference value although the largest metric is smaller than the first reference value, it is determined that the likelihood of the largest metric is sufficient, and the potential payload value of the largest metric is determined as a payload. If either of the 2 conditions is not satisfied, it is determined that the largest metric does not have superior likelihood with respect to a specific potential value because noise is added to the received signal, and the payload obtained from a previous frame is determined as a current payload instead of determining a payload of the frame including the received signal. This is because control data has a low probability of change according to frames. Thus, even if it is difficult to detect a correct signal from a frame, control data of a previous frame needs to be kept. An algorithm of FIG. 19 is expressed in programming language as follows:

| Decision |
|---|
| Find Max(K)and Second(K) |
| if Max(K)>Threshold |
|     Make decision |
| elseif (Max(K)−Second(K))>Threshold_second |
|     Make Decision |
| else |
|     Payload = Payload_PreviousFrame |
| end |

Figure 20:
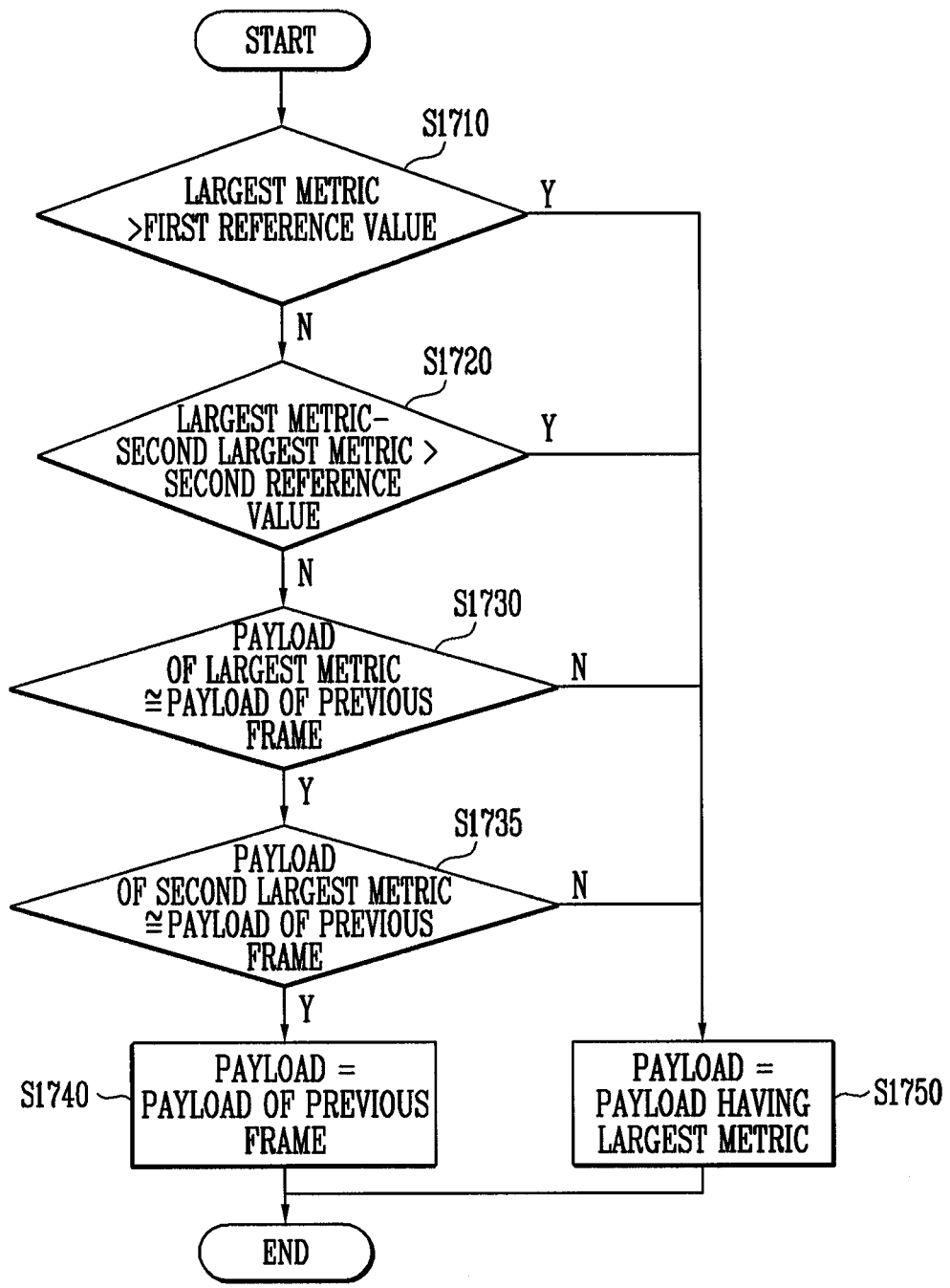

According to the second method illustrated in the flowchart of FIG. 20, step 1700 comprises the steps of: if the largest metric exceeds a predetermined first reference value, determining a potential value having the largest metric as a payload; if the largest metric does not exceed the first reference value, determining whether a difference between the largest metric and the second largest metric exceeds a predetermined second reference value or not; if the difference between the metrics exceeds the second reference value, determining the potential value having the largest metric as a payload; if the difference does not exceed the second reference value, determining whether the potential value having the largest metric and another potential value having the second largest metric are similar to the payload of a previous frame within a predetermined range or not; if they are similar to the payload within the predetermined range, determining the payload of the previous frame as a payload; and if they are not similar to the payload within the predetermined range, determining the potential value having the largest metric as a payload.

According to the second method of FIG. 20, if it is determined in step 1720 that the difference does not exceed the second reference value, it is determined in step 1730 whether the payload of the largest metric is similar to the payload of the previous frame within the predetermined range, and in step 1735 whether the payload of the second largest metric is similar to the payload of the previous frame within the predetermined range. Here, the similarity range includes 4 margins, i.e., a margin increasing more than the reference value, a margin decreasing less than the reference value, a margin versus the largest metric, and a margin versus the second largest metric. The 4 margins may have different values, but it is preferable for simplification of structure to give the same value to the 4 margins. If the potential values having the largest metric and the second largest metric are similar to the payload of the previous frame within a predetermined range, it is determined that there is no change in control data between the previous frame and the current frame, and the payload of the previous frame is determined as a payload in step 1740. Otherwise, the payload of the largest metric is determined as a payload in step 1750.

Figure 21:
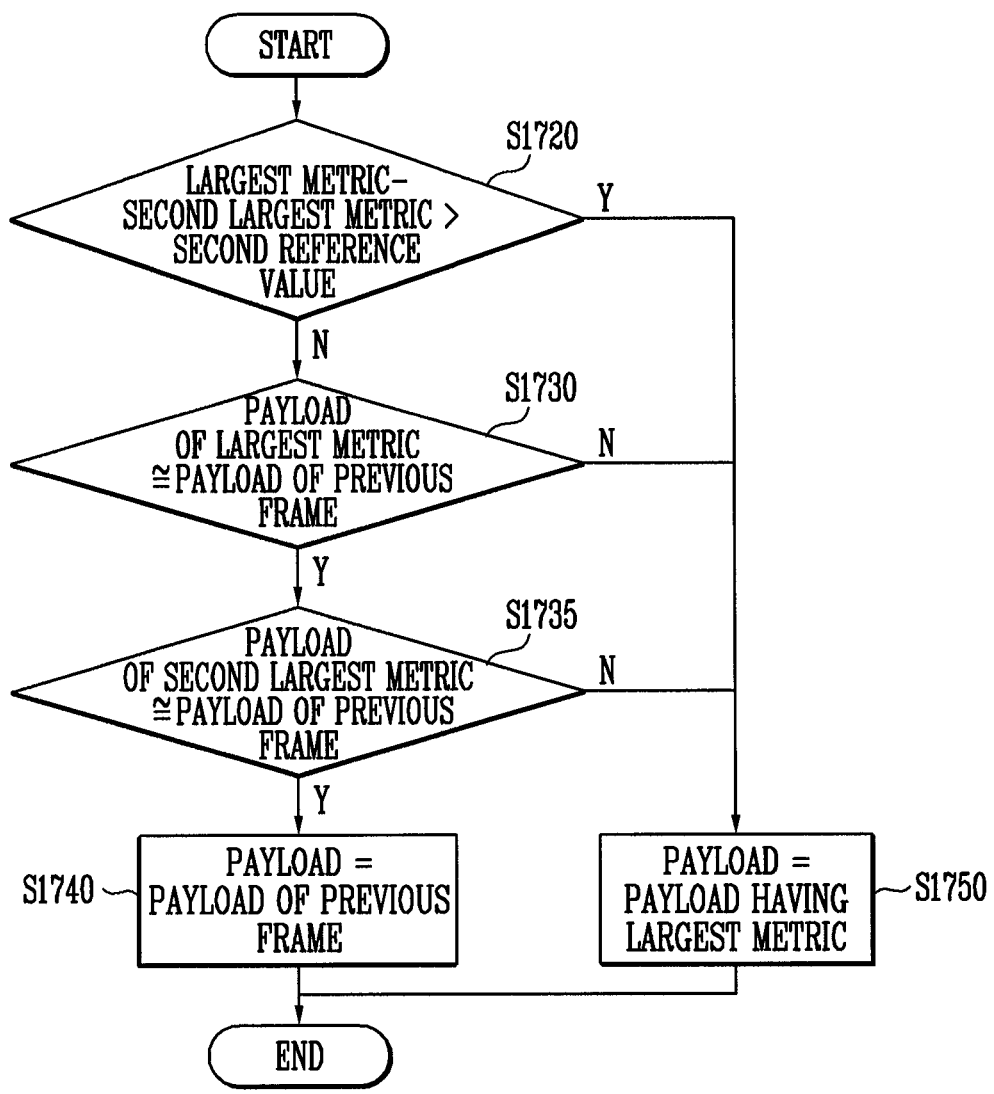

According to the third method illustrated in the flowchart of FIG. 21, step 1700 comprises the steps of: if a difference between the largest metric and the second largest metric exceeds a predetermined second reference value, determining a potential value having the largest metric as a payload; if the difference does not exceed the second reference value, determining whether the potential value having the largest metric and another potential value having the second largest metric are similar to the payload of a previous frame within a predetermined range; if they are similar to the payload within the predetermined range, determining the payload of the previous frame as a payload; and if they are not similar to the payload within the predetermined range, determining the potential value having the largest metric as a payload. Since the illustrated flowchart is the same as that shown in FIG. 20, except that step 1710 is omitted, a description thereof will not be reiterated. An algorithm of FIG. 21 is expressed in programming language as follows:

| Decision |
| --- |
| Find Max(K), get the payload and second_payload<br>if (Max(K)−second(K))>Threshold<br>    Make decision<br>elseif (payload ~= payload_PreviousFrame & second_payload == Payload_previousFrame)<br>    Payload = Payload_PreviousFrame<br>Else<br>    Payload = Payload_CurrentFrame<br>end |

Figure 22:
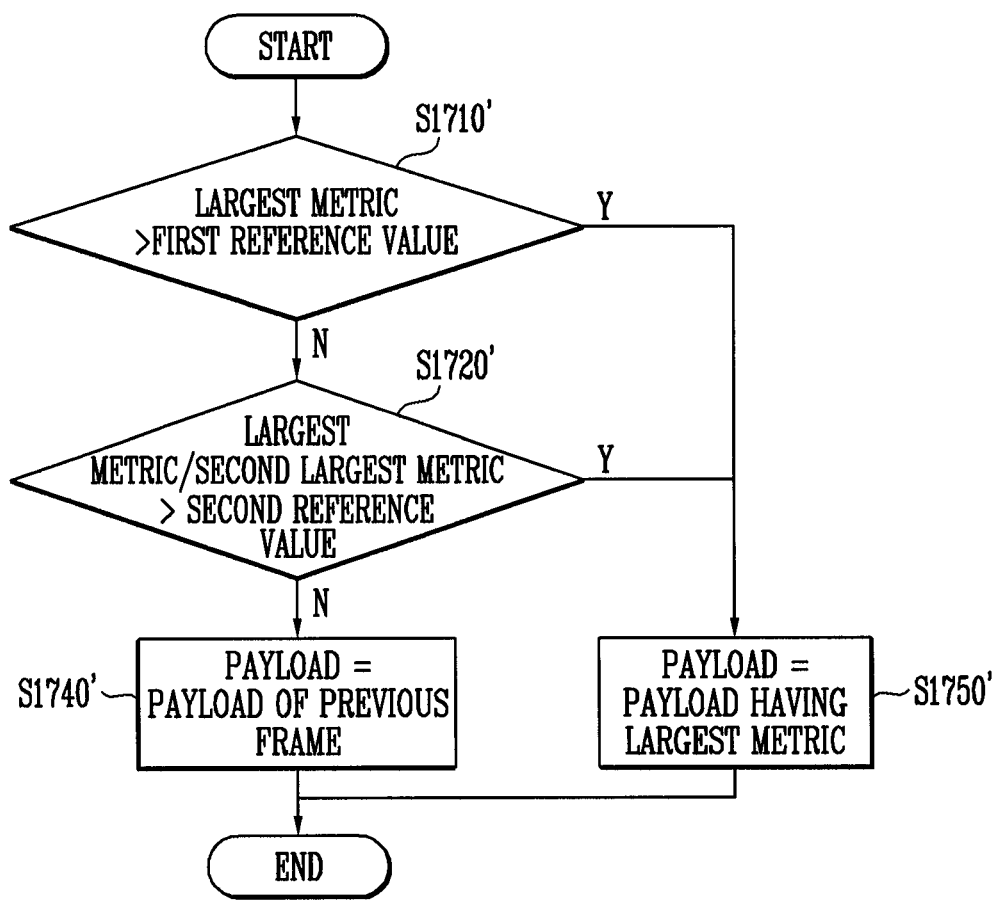

According to the fourth method illustrated in the flowchart of FIG. 22, step 1700 comprises the steps of: if the largest metric exceeds a predetermined first reference value, determining a potential value having the largest metric as a payload; if the largest metric does not exceed the first reference value, determining whether a quotient obtained by dividing the largest metric by the second largest metric exceeds a predetermined second reference value or not; if the quotient exceeds the second reference value, determining the potential value having the largest metric as a payload; and if the quotient does not exceed the second reference value, determining the payload of a previous frame as a payload.

The first method determines whether likelihood is sufficient or not according to a difference between the largest metric and the second largest metric, while the fourth method determines whether likelihood is sufficient or not according to the quotient obtained by dividing the largest metric by the second largest metric. More specifically, if the quotient exceeds the predetermined second reference value, it is determined that the likelihood of a potential payload value having the largest metric is sufficient. Except for the above mentioned, the flowchart is the same as of the first method, and thus a description thereof will not be reiterated. An algorithm of FIG. 22 is expressed in programming language as follows:

| Decision |
| --- |
| Find Max(K) and Second(K)<br>if Max(K)>Threshold<br>    Make decision<br>elseif (Max(K)/Second(K))>Threshold_second<br>    Make Decision<br>else<br>    Payload = Payload_PreviousFrame<br>end |

According to the fifth method illustrated in the flowchart of FIG. 23, step 1700 comprises the steps of: if the largest metric exceeds a predetermined first reference value, determining a potential value having the largest metric as a payload; if the largest metric does not exceed the first reference value, determining whether a quotient obtained by dividing the largest metric by the second largest metric exceeds a predetermined second reference value or not; if the quotient exceeds the second reference value, determining the potential value having the largest metric as a payload; if the quotient does not exceed the second reference value, determining whether the potential value having the largest metric and another potential value having the second largest metric are similar to the payload of a previous frame within a predetermined range or not; if they are similar to the payload within the predetermined range, determining the payload of the previous frame as a payload; and if they are not similar to the payload within the predetermined range, determining the potential value having the largest metric as a payload.

The fifth method is the same as the second method, except for whether likelihood is sufficient or not is determined according to the quotient obtained by dividing the largest metric by the second largest metric, and thus a description thereof will not be reiterated.

According to the sixth method illustrated in the flowchart of FIG. 24, step 1700 comprises the steps of: if a quotient obtained by dividing the largest metric by the second largest metric exceeds a predetermined second reference value, determining a potential value having the largest metric as a payload; if the quotient does not exceed the second reference value, determining whether the potential value having the largest metric and another potential value having the second largest metric are similar to the payload of a previous frame within a predetermined range or not; if they are similar to the payload within the predetermined range, determining the payload of the previous frame as a payload; and if they are not similar to the payload within the predetermined range, determining the potential value having the largest metric as a payload. Since the illustrated flowchart is the same as that shown in FIG. 23, except that step 1710' is omitted, a description thereof will not be reiterated. An algorithm of FIG. 23 is expressed in programming language as follows:

| Decision |
| --- |
| Find Max(K), get the payload and second_payload<br>if (Max(K)/second(K))>Threshold<br>    Make decision<br>elseif (payload ~= payload_PreviousFrame & second_payload == Payload_PreviousFrame)<br>    Payload = Payload_PreviousFrame<br>Else<br>    Payload = Payload_CurrentFrame<br>end |

A decoding apparatus performing the decoding process of this exemplary embodiment in a system supporting the OFDM/OFDMA scheme is illustrated in FIG. 14. In the decoding apparatus, a wireless channel estimation/compensation means 100 implementing the spirit of the present invention is illustrated in FIG. 15, and a demodulation/decoding means 200 is illustrated in FIG. 25.

As illustrated in FIG. 25, the demodulation/decoding means 200 of this exemplary embodiment comprises: the receiving buffer 1260 for buffering input QPSK-modulated signals; a likelihood metric generator 1210 for generating decoding metrics corresponding to likelihoods of the received signals buffered in the receiving buffer 1260 being determined as respective potential payload values; a previous payload recorder 1280 for storing a previous payload determined on the basis of a previous frame; and a payload determiner 1270 for determining one of potential payload values having the largest decoding metric or the previous payload as a payload.

In some embodiments, the likelihood metric generator 1210 may comprise: a correlation metric generator 1220 for generating correlation metrics from the received signals buffered in the receiving buffer 1260; and a decoding metric generator 1240 for summing up respective subsets of the correlation metrics designated for all the potential payload values and generating decoding metrics. In addition, a correlation metric buffer 1230 for storing the correlation metrics may be further included. In FIG. 25, the receiving buffer 1260 is shown as a component included in the demodulation/decoding means 200, but from another point of view, may be seen as a separate component from the demodulation/decoding means 200. The receiving buffer 1260 may include a plurality of tile buffers for buffering received signals according to tiles constituting a subchannel. In an exemplary embodiment according to the portable Internet standards IEEE 802.16d or IEEE 802.16e, there are 6 tile buffers from tile buffer #0 to tile buffer #5. Tile buffer #0, i.e., a buffer for tile No. 0, stores received signal Nos. 0 to 7 among 48 received signals identified by numbers from 0 to 47, tile buffer #1 stores received signal Nos. 8 to 15, and tile buffer #2 stores received signal Nos. 16 to 23. The same process is repeated in the same way, and the final buffer #5 stores received signal Nos. 40 to 47.

A basis vector generator 1225 for generating basis vector signal sets required for demodulation may be further included. The basis vector generator 1225 may include a demodulation table in which patterns of 8 basis vectors are recorded, and reads the pattern information of the basis vectors and generates basis vector signals required for performing demodulation. Here, the basis vectors denote values of 0 to 7, respectively. In Table 5, a result value obtained by applying a first column of the demodulation table is m00, and a result value obtained by applying an eighth, i.e., the last, column is m07.

The payload determiner 1270 determines the largest metric and the second largest metric of the decoding metrics generated by the decoding metric generator 1240, and determines a payload using the largest metric and the second largest metric according to one of methods illustrated in FIGS. 19 to 24. In order to perform the payload determination methods illustrated in FIGS. 19 to 24, the previous payload recorder 1280 for storing the payload of a previous frame may be further included. The previous payload recorder 1280 stores a payload determined on the basis of the current frame.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A decoding method in a system supporting an Orthogonal Frequency Division Multiplexing (OFDM)/Orthogonal Frequency Division Multiple Access (OFDMA) scheme, the decoding method comprising:

receiving phase-modulated signal through a plurality of tiles, wherein a payload corresponding to the phase-modulated signal is mapped to a vector index sequence including a plurality of vector indices, wherein each vector index of the plurality of vector indices is mapped to a basis vector set among a plurality of basis vector sets, wherein each of the plurality of basis vector sets includes a plurality of subcarrier modulated values, wherein a first mapping rule is determined between the input payload and the vector index sequence, wherein a second mapping rule is determined between the plurality of vector indices and the plurality of basis vector sets;

performing subcarrier demodulation on the received phase-modulated signal and generating correlation metrics, wherein the correlation metrics are obtained by using the received phase-modulated signal and the plurality of basis vector sets associated with the second mapping rule;

generating decoding metrics for respective potential payload values, wherein each element of the decoding metrics is obtained by summing up a number of elements of the correlation metrics, wherein the number of elements of the correlation metrics are selected based on the first mapping rule; and determining the payload using a largest metric of the decoding metrics and at least one of an average metric and a second largest metric of the decoding metrics.

2. The decoding method of claim 1, wherein in the step of determining a payload, a potential payload value having the largest metric or a payload determined on the basis of a previous frame is determined as a payload according to a comparison result of the largest metric and at least one of the average metric and the second largest metric.

3. The decoding method of claim 1, wherein in the step of generating correlation metrics, the subcarrier demodulation is performed by different methods depending on whether or not channel compensation is performed on the received signals.

4. The decoding method of claim 1, wherein the second mapping rule determines the plurality of subcarrier modulated values included in one basis vector set to represent one of the plurality of vector indices.

5. The decoding method of claim 1, wherein the phase-modulated signal comprises a feedback message or an acknowledgment message.

6. The decoding method of claim 1, wherein the average metric is a mean of largest metrics determined in decoding processes for previous frames.

7. The decoding method of claim 1, wherein the average metric is a mean of decoding metrics of previous frames and the decoding metrics of a current frame.

8. The decoding method of claim 1, wherein the average metric is a mean of decoding metrics of previous frames or the decoding metrics of a current frame.

9. The decoding method of claim 1, wherein the average metric is a mean of metrics exceeding a predetermined reference value among decoding metrics of previous frames and the decoding metrics of a current frame.

10. The decoding method of claim 1, wherein the average metric is a mean of metrics exceeding a predetermined reference value among decoding metrics of previous frames or the decoding metrics of a current frame.

11. The decoding method of claim 1, wherein the step of determining a payload using the average metric comprises the steps of:
   determining a potential payload value having the largest metric as the payload if the largest metric exceeds a predetermined first reference value;
   determining whether a difference between the largest metric and the average metric exceeds a predetermined second reference value or not, if the largest metric does not exceed the first predetermined reference value;
   determining the potential payload value having the largest metric as the payload if the difference between the metrics exceeds the second predetermined reference value; and determining a payload of a previous frame as the payload if the difference between the metrics does not exceed the predetermined second reference value.

12. The decoding method of claim 1, wherein the step of determining a payload using the second largest metric comprises the steps of:
   determining a potential payload value having the largest metric as the payload if the largest metric exceeds a predetermined first reference value;
   determining whether a difference between the largest metric and the second largest metric exceeds a predetermined second reference value or not, if the largest metric does not exceed the first predetermined reference value;
   determining the potential payload value having the largest metric as the payload if the difference between the metrics exceeds the second predetermined reference value; and
   determining a payload of a previous frame as the payload if the difference between the metrics does not exceed the second predetermined reference value.

13. The decoding method of claim 1, wherein the step of determining a payload using the average metric comprises the steps of:
   determining a potential payload value having the largest metric as the payload if the largest metric exceeds a predetermined first reference value;
   determining whether a difference between the largest metric and the average metric exceeds a predetermined second reference value or not, if the largest metric does not exceed the predetermined first reference value;
   determining the potential payload value having the largest metric as the payload if the difference between the metrics exceeds the second predetermined reference value;
   determining whether the potential payload value having the largest metric and another potential payload value having the second largest metric are similar to a payload of a previous frame within a predetermined range if the difference between the metrics does not exceed the second predetermined reference value;
   determining the payload of the previous frame as the payload if the potential payload values are similar to the payload of the previous frame within a predetermined range; and
   determining the potential payload value having the largest metric as the payload if the potential payload values are not similar to the payload of the previous frame within a predetermined range.

14. The decoding method of claim 1, wherein the step of determining a payload using the second largest metric comprises the steps of:
   determining a potential payload value having the largest metric as the payload if the largest metric exceeds a predetermined first reference value;
   determining whether a difference between the largest metric and the second largest metric exceeds a predetermined second reference value or not, if the largest metric does not exceed the predetermined first reference value;
   determining the potential payload value having the largest metric as the payload if the difference between the metrics exceeds the predetermined second reference value;
   determining whether the potential payload value having the largest metric and another potential payload value having the second largest metric are similar to a payload of a previous frame within a predetermined range if the difference between the metrics does not exceed the predetermined second reference value;
   determining the payload of the previous frame as the payload if the potential payload values are similar to the payload of the previous frame within a predetermined range; and
   determining the potential payload value having the largest metric as the payload if the potential payload values are not similar to the payload of the previous frame within a predetermined range.

15. The decoding method of claim 1, wherein the step of determining a payload using the average metric comprises the steps of:
   determining a potential value having the largest metric as the payload if a difference between the largest metric and the average metric exceeds a predetermined reference value;
   determining whether the potential value having the largest metric and another potential value having the second largest metric are similar to a payload of a previous frame within a predetermined range if the difference does not exceed the reference value;
   determining the payload of the previous frame as the payload if the potential values are similar to the payload of the previous frame within a predetermined range; and
   determining the potential value having the largest metric as the payload if the potential values are not similar to the payload of the previous frame within a predetermined range.

16. The decoding method of claim 1, wherein the step of determining a payload using the second largest metric comprises the steps of:
   determining a potential value having the largest metric as the payload if a difference between the largest metric and the second largest metric exceeds a predetermined reference value;
   determining whether the potential value having the largest metric and another potential value having the second largest metric are similar to a payload of a previous frame within a predetermined range if the difference does not exceed the reference value;
   determining the payload of the previous frame as the payload if the potential value are similar to the payload of the previous frame within a predetermined range; and
   determining the potential value having the largest metric as the payload if the potential value are not similar to the payload of the previous frame within a predetermined range.

17. The decoding method of claim 1, wherein the step of determining a payload using the average metric comprises the steps of:

determining a potential payload value having the largest metric as the payload if the largest metric exceeds a predetermined first reference value;

determining whether a quotient obtained by dividing the largest metric by the average metric exceeds a predetermined second reference value or not, if the largest metric does not exceed the predetermined first reference value;

determining the potential payload value having the largest metric as the payload if the quotient exceeds the predetermined second reference value; and determining a payload of a previous frame as the payload if the quotient does not exceed the predetermined second reference value.

18. The decoding method of claim 1, wherein the step of determining a payload using the second largest metric comprises the steps of:

determining a potential payload value having the largest metric as the payload if the largest metric exceeds a predetermined first reference value;

determining whether a quotient obtained by dividing the largest metric by the second largest metric exceeds a predetermined second reference value or not, if the largest metric does not exceed the predetermined first reference value;

determining the potential payload value having the largest metric as the payload if the quotient exceeds the predetermined second reference value; and determining a payload of a previous frame as the payload if the quotient does not exceed the predetermined second reference value.

19. The decoding method of claim 1, wherein the step of determining a payload using the average metric comprises the steps of:

determining a potential payload value having the largest metric as the payload if the largest metric exceeds a predetermined first reference value;

determining whether a quotient obtained by dividing the largest metric by the average metric exceeds a predetermined second reference value or not, if the largest metric does not exceed the predetermined first reference value;

determining the potential payload value having the largest metric as the payload if the quotient exceeds the predetermined second reference value;

determining whether the potential payload value having the largest metric and another potential payload value having the second largest metric are similar to a payload of a previous frame within a predetermined range if the quotient does not exceed the predetermined second reference value;

determining the payload of the previous frame as the payload if the potential payload values are similar to the payload of the previous frame within a predetermined range; and determining the potential payload value having the largest metric as the payload if the potential payload values are not similar to the payload of the previous frame within a predetermined range.

20. The decoding method of claim 1, wherein the step of determining a payload using the second largest metric comprises the steps of:

determining a potential payload value having the largest metric as the payload if the largest metric exceeds a predetermined first reference value;

determining whether a quotient obtained by dividing the largest metric by the second largest metric exceeds a predetermined second reference value or not, if the largest metric does not exceed the predetermined first reference value;

determining the potential payload value having the largest metric as the payload when the quotient exceeds the predetermined second reference value;

determining whether the potential payload value having the largest metric and another potential payload value having the second largest metric are similar to a payload of a previous frame within a predetermined range when the quotient does not exceed the predetermined second reference value;

determining the payload of the previous frame as the payload if the potential payload values are similar to the payload of the previous frame within a predetermined range; and determining the potential payload value having the largest metric as the payload if the potential payload values are not similar to the payload of the previous frame within a predetermined range.

21. The decoding method of claim 1, wherein the step of determining a payload using the average metric comprises the steps of:

determining a potential value having the largest metric as the payload if a quotient obtained by dividing the largest metric by the average metric exceeds a predetermined reference value;

determining whether the potential value having the largest metric and another potential value having the second largest metric are similar to a payload of a previous frame within a predetermined range if the quotient does not exceed the reference value;

determining the payload of the previous frame as the payload if the potential values are similar to the payload of the previous frame within a predetermined range; and determining the potential value having the largest metric as the payload if the potential values are not similar to the payload of the previous frame within a predetermined range.

22. The decoding method of claim 1, wherein the step of determining a payload using the second largest metric comprises the steps of:

determining a potential value having the largest metric as the payload if a quotient obtained by dividing the largest metric by the second largest metric exceeds a predetermined reference value;

determining whether the potential value having the largest metric and another potential value having the second largest metric are similar to a payload of a previous frame within a predetermined range if the quotient does not exceed the reference value;

determining the payload of the previous frame as the payload if the potential values are similar to the payload of the previous frame within a predetermined range; and determining the potential value having the largest metric as the payload if the potential values are not similar to the payload of the previous frame within a predetermined range.

23. A decoding apparatus in a system supporting an Orthogonal Frequency Division Multiplexing (OFDM)/Orthogonal Frequency Division Multiple Access (OFDMA) scheme, the decoding apparatus comprising:

a receiving buffer for buffering received phase-modulated signal, wherein the phase-modulated signal is received through a plurality of tiles, wherein a payload corresponding to the phase-modulated signal is mapped to a vector index sequence including a plurality of vector indices, wherein each vector index of the plurality of vector indices is mapped to a basis vector set among a plurality of basis vector sets, wherein each of the plurality of basis vector sets includes a plurality of subcarrier modulated values, wherein a first mapping rule is determined between the input payload and the vector index sequence, wherein a second mapping rule is determined between the plurality of vector indices and the plurality of basis vector sets;

a first metric generator for generating correlation metrics, wherein the correlation metrics are obtained by using the received phase-modulated signal and the plurality of basis vector sets associated with the second mapping rule;

a likelihood second metric generator for generating decoding metrics corresponding to likelihoods of the received phase-modulated signal by summing up a subset of correlation metrics for respective potential payload values, wherein each element of the decoding metrics is obtained by summing up a number of elements of the correlation metrics, wherein the number of elements of the correlation metrics are selected based on the first mapping rule; and a payload determiner for determining the payload using a largest metric of the decoding metrics and at least one of an average metric and a second largest metric of the decoding metrics.

24. The decoding apparatus of claim 23, further comprising:
a mean calculator for calculating the average metric of the decoding metrics.

25. The decoding apparatus of claim 24, wherein the mean calculator averages largest metrics determined in decoding processes for previous frames.

26. The decoding apparatus of claim 24, wherein the mean calculator averages decoding metrics of previous frames and the decoding metrics of a current frame.

27. The decoding apparatus of claim 24, wherein the mean calculator averages decoding metrics of previous frames or the decoding metrics of a current frame.

28. The decoding apparatus of claim 24, wherein the mean calculator averages decoding metrics exceeding a predetermined reference value among decoding metrics of previous frames and the decoding metrics of a current frame.

29. The decoding apparatus of claim 24, wherein the mean calculator averages decoding metrics exceeding a predetermined reference value among decoding metrics of previous frames or the decoding metrics of a current frame.

30. The decoding apparatus of claim 23, wherein the payload determiner determines potential payload values having the largest decoding metric, or a previous payload determined on the basis of a previous frame, as the payload.

31. The decoding apparatus of claim 30, further comprising:
a previous payload recorder for storing the previous payload.

32. The decoding apparatus of claim 23, wherein the second metric generator comprises: a correlation metric generator for generating correlation metrics from the received phase-modulated signal buffered in the receiving buffer; and
a decoding metric generator for summing up respective subsets of the correlation metrics designated for all potential payload values and generating decoding metrics.

33. The decoding apparatus of claim 32, further comprising:
a correlation metric buffer for storing the correlation metrics.

34. The decoding apparatus of claim 23, wherein the received phase-modulated signal comprises a feedback message or an acknowledgment message.

35. The decoding apparatus of claim 23, wherein the payload determiner to perform a payload determination process using the average metric comprising the steps of:
retrieving the largest metric;
determining a potential payload value having the largest metric as the payload if the largest metric exceeds a predetermined first reference value;
determining whether a difference between the largest metric and the average metric exceeds a predetermined second reference value or not, if the largest metric does not exceed the predetermined first reference value;
determining the potential payload value having the largest metric as the payload if the difference between the metrics exceeds the predetermined second reference value; and
determining a payload of a previous frame as the payload if the difference between the metrics does not exceed the predetermined second reference value.

36. The decoding apparatus of claim 23, wherein the payload determiner to perform a payload determination process using the second largest metric comprising the steps of:
retrieving the largest metric and the second largest metric;
determining a potential payload value having the largest metric as the payload if the largest metric exceeds a predetermined first reference value;
determining whether a difference between the largest metric and the second largest metric exceeds a predetermined second reference value or not, if the largest metric does not exceed the predetermined first reference value;
determining the potential payload value having the largest metric as the payload if the difference between the metrics exceeds the predetermined second reference value; and
determining a payload of a previous frame as the payload if the difference between the metrics does not exceed the predetermined second reference value.

37. The decoding apparatus of claim 23, wherein the payload determiner to perform a payload determination process using the average metric comprising the steps of:
retrieving the largest metric and the second largest metric;
determining a potential payload value having the largest metric as the payload if the largest metric exceeds a predetermined first reference value;
determining whether a difference between the largest metric and the average metric exceeds a predetermined second reference value or not, if the largest metric does not exceed the predetermined first reference value;
determining the potential payload value having the largest metric as the payload if the difference between the metrics exceeds the predetermined second reference value;
determining whether the potential payload value having the largest metric and another potential payload value having the second largest metric are similar to a payload of a previous frame within a predetermined range if the difference between the metrics does not exceed the predetermined second reference value;
determining the payload of the previous frame as the payload if the potential payload values are similar to the payload of the previous frame within a predetermined range; and determining the potential payload value having the largest metric as the payload if the potential payload values are not similar to the payload of the previous frame within a predetermined range.

38. The decoding apparatus of claim 23, wherein the payload determiner to perform a payload determination process using the second largest metric comprising the steps of:
retrieving the largest metric and the second largest metric;
determining a potential payload value having the largest metric as the payload if the largest metric exceeds a predetermined first reference value;
determining whether a difference between the largest metric and the second largest metric exceeds a predetermined second reference value or not, if the largest metric does not exceed the predetermined first reference value;
determining the potential payload value having the largest metric as the payload if the difference between the metrics exceeds the predetermined second reference value;
determining whether the potential payload value having the largest metric and another potential payload value having the second largest metric are similar to a payload of a previous frame within a predetermined range if the difference between the metrics does not exceed the predetermined second reference value;
determining the payload of the previous frame as the payload if the potential payload values are similar to the payload of the previous frame within a predetermined range; and
determining the potential payload value having the largest metric as the payload if the potential payload values are not similar to the payload of the previous frame within a predetermined range.

39. The decoding apparatus of claim 23, wherein the payload determiner to perform a payload determination process using the average metric comprising the steps of:
retrieving the largest metric and the second largest metric;
determining a potential value having the largest metric as the payload if a difference between the largest metric and the average metric exceeds a predetermined reference value;
determining whether the potential value having the largest metric and another potential value having the second largest metric are similar to a payload of a previous frame within a predetermined range if the difference does not exceed the reference value;
determining the payload of the previous frame as the payload if the potential values are similar to the payload of the previous frame within a predetermined range; and
determining the potential value having the largest metric as the payload if the potential values are not similar to the payload of the previous frame within a predetermined range.

40. The decoding apparatus of claim 23, wherein the payload determiner to perform a payload determination process using the second largest metric comprising the steps of:
retrieving the largest metric and the second largest metric;
determining a potential value having the largest metric as the payload if a difference between the largest metric and the second largest metric exceeds a predetermined reference value;
determining whether the potential value having the largest metric and another potential value having the second largest metric are similar to a payload of a previous frame within a predetermined range if the difference does not exceed the reference value;

determining the payload of the previous frame as the payload if the potential values are similar to the payload of the previous frame within a predetermined range; and
determining the potential value having the largest metric as the payload if the potential values are not similar to the payload of the previous frame within a predetermined range.

41. The decoding apparatus of claim 23, wherein the payload determiner to perform a payload determination process using the average metric comprising the steps of:
retrieving the largest metric;
determining a potential payload value having the largest metric as the payload if the largest metric exceeds a predetermined first reference value;
determining whether a quotient obtained by dividing the largest metric by the average metric exceeds a predetermined second reference value or not, if the largest metric does not exceed the predetermined first reference value;
determining the potential payload value having the largest metric as the payload if the quotient exceeds the predetermined second reference value; and
determining a payload of a previous frame as the payload if the quotient does not exceed the predetermined second reference value.

42. The decoding apparatus of claim 23, wherein the payload determiner to perform a payload determination process using the second largest metric comprising the steps of:
retrieving the largest metric and the second largest metric;
determining a potential payload value having the largest metric as the payload if the largest metric exceeds a predetermined first reference value;
determining whether a quotient obtained by dividing the largest metric by the second largest metric exceeds a predetermined second reference value or not, if the largest metric does not exceed the predetermined first reference value;
determining the potential payload value having the largest metric as the payload if the quotient exceeds the predetermined second reference value; and
determining a payload of a previous frame as the payload if the quotient does not exceed the predetermined second reference value.

43. The decoding apparatus of claim 23, wherein the payload determiner to perform a payload determination process using the average metric comprising the steps of: retrieving the largest metric and the second largest metric;
determining a potential payload value having the largest metric as the payload if the largest metric exceeds a predetermined first reference value;
determining whether a quotient obtained by dividing the largest metric by the average metric exceeds a predetermined second reference value or not, if the largest metric does not exceed the predetermined first reference value;
determining the potential payload value having the largest metric as the payload if the quotient exceeds the predetermined second reference value;
determining whether the potential payload value having the largest metric and another potential payload value having the second largest metric are similar to a payload of a previous frame within a predetermined range if the quotient does not exceed the predetermined second reference value;
determining the payload of the previous frame as the payload if the potential payload values are similar to the payload of the previous frame within a predetermined range; and determining the potential payload value having the largest metric as the payload if the potential payload values are not similar to the payload of the previous frame within a predetermined range.

44. The decoding apparatus of claim 23, wherein the payload determiner to perform a payload determination process using the second largest metric and the process comprising the steps of:
- retrieving the largest metric and the second largest metric;
- determining a potential payload value having the largest metric as the payload if the largest metric exceeds a predetermined first reference value;
- determining whether a quotient obtained by dividing the largest metric by the second largest metric exceeds a predetermined second reference value or not, if the largest metric does not exceed the predetermined first reference value;
- determining the potential payload value having the largest metric as the payload if the quotient exceeds the predetermined second reference value;
- determining whether the potential payload value having the largest metric and another potential payload value having the second largest metric are similar to a payload of a previous frame within a predetermined range if the quotient does not exceed the predetermined second reference value;
- determining the payload of the previous frame as the payload if the potential payload values are similar to the payload of the previous frame within a predetermined range; and
- determining the potential payload value having the largest metric as the payload if the potential payload values are not similar to the payload of the previous frame within a predetermined range.

45. The decoding apparatus of claim 23, wherein the payload determiner to perform a payload determination process using the average metric and the process comprising the steps of:
- retrieving the largest metric and the second largest metric;
- determining a potential value having the largest metric as the payload if a quotient obtained by dividing the largest metric by the average metric exceeds a predetermined reference value;
- determining whether the potential value having the largest metric and another potential value having the second largest metric are similar to a payload of a previous frame within a predetermined range if the quotient does not exceed the reference value;
- determining the payload of the previous frame as the payload if the potential values are similar to the payload of the previous frame within a predetermined range; and
- determining the potential value having the largest metric as the payload if the potential values are not similar to the payload of the previous frame within a predetermined range.

46. The decoding apparatus of claim 23, wherein the payload determiner to perform a payload determination process using the second largest metric and the process comprising the steps of:
- retrieving the largest metric and the second largest metric;
- determining a potential value having the largest metric as the payload if a quotient obtained by dividing the largest metric by the second largest metric exceeds a predetermined reference value;
- determining whether the potential value having the largest metric and another potential value having the second largest metric are similar to a payload of a previous frame within a predetermined range if the quotient does not exceed the reference value;
- determining the payload of the previous frame as the payload if the potential values are similar to the payload of the previous frame within a predetermined range; and
- determining the potential value having the largest metric as the payload if the potential values are not similar to the payload of the previous frame within a predetermined range.

* * * * *